(12) United States Patent
Tommie, Jr.

(10) Patent No.: US 8,672,058 B2
(45) Date of Patent: Mar. 18, 2014

(54) METHOD FOR REPAIRING ABERRATIONS ALONG A DRILL BORE WALL

(75) Inventor: Shelton E. Tommie, Jr., Portland, MI (US)

(73) Assignee: GeoThermal Technologies, Inc., LaGrange, IL (US)

( * ) Notice: Subject to any disclaimer, the term of this patent is extended or adjusted under 35 U.S.C. 154(b) by 861 days.

(21) Appl. No.: 12/645,741

(22) Filed: Dec. 23, 2009

(65) Prior Publication Data

US 2011/0011557 A1  Jan. 20, 2011

Related U.S. Application Data

(60) Provisional application No. 61/270,851, filed on Jul. 14, 2009.

(51) Int. Cl.
*E21B 33/138* (2006.01)
(52) U.S. Cl.
USPC .............................. 175/72; 175/21; 405/241
(58) Field of Classification Search
USPC .................... 175/21, 57, 72; 405/235, 241
See application file for complete search history.

(56) References Cited

U.S. PATENT DOCUMENTS

| | | | | |
|---|---|---|---|---|
| 2,642,268 A * | 6/1953 | Armentrout | ..................... | 175/72 |
| 2,879,846 A * | 3/1959 | Dawson, Jr. | .................. | 166/286 |
| 3,047,079 A * | 7/1962 | Wepsala, Jr. | .................. | 175/107 |
| 3,318,378 A * | 5/1967 | Coshow | ..................... | 166/254.1 |
| 3,336,760 A * | 8/1967 | Landau | ......................... | 405/238 |
| 3,690,109 A * | 9/1972 | Turzillo | ......................... | 405/241 |
| 3,760,891 A * | 9/1973 | Gadbois | ..................... | 73/152.21 |
| 4,832,535 A * | 5/1989 | Crambes | ........................ | 405/266 |
| 5,810,085 A * | 9/1998 | James et al. | .................. | 166/292 |
| 6,183,166 B1 * | 2/2001 | Schellhorn | .................... | 405/233 |
| 2008/0044237 A1 * | 2/2008 | Okita | ........................ | 405/258.1 |

* cited by examiner

*Primary Examiner* — William P Neuder
*Assistant Examiner* — Richard Alker
(74) *Attorney, Agent, or Firm* — Cherskov Flaynik & Gurda, LLC

(57) ABSTRACT

The invention provides a system for adapting an HVAC system in an existing building for utilizing geothermal energy, the system comprising an incoming flux of geothermal energy; a plurality of heat exchange surfaces adapted to receive the incoming flux of geothermal energy; and an interface between the HVAC system and the heat exchange surfaces, said interface adapted to transfer the geothermal energy to the system. Also provided is a method for repairing aberrations in drill borings, the method comprising using a rotary mud drill system to produce a drill hole up to the location of the aberrations; removing the rotary mud drill from the drill hole; inserting an auger into the drill hole to a point directly above the location of the aberrations; actuating the auger; introducing loose substrate into the drill hole; allowing the substrate to contact the auger; and lifting and lowering the auger along longitudinally extending regions of the drill hole defining the aberrations for a time and in substrate amounts sufficient to fill the aberrations. The invention also provides a system which facilitates rotating drill bits at an rpm which are multiples faster than their associated drill strings.

6 Claims, 12 Drawing Sheets

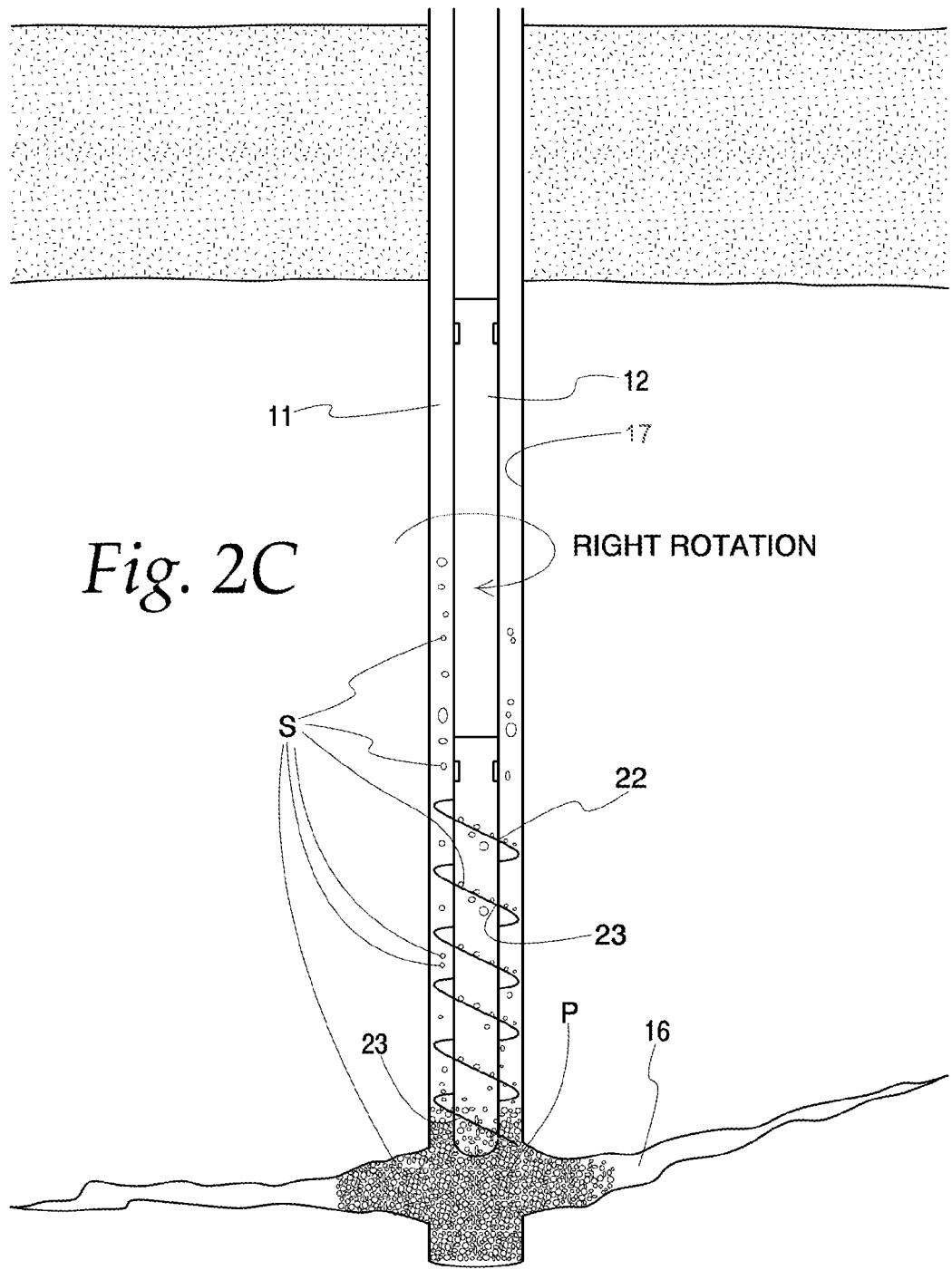

METHOD FOR REPAIRING ABERRATIONS ALONG A DRILL BORE WALL

PRIORITY

This application claims the benefits of U.S. Provisional Application No. 61/270,851, filed on Jul. 14, 2009.

BACKGROUND OF THE INVENTION

1. Field of the Invention

This invention relates to a system and a method to enable widespread adoption of geothermal energy and more particularly this invention relates to a system and a method for facilitating energy transfer from a geothermal field to an existing HVAC system of a building with minimal retrofit, thereby enhancing or retro fitting existing conventional HVAC systems with minimal interference of daily activity within the building.

2. Background of the Invention

Geothermal energy is an alternative energy source existing under ground. The goal for geothermal energy use is to utilize the typical midrange constant temperatures of 52 to 54° F. found beneath the earth's surface to help heat or cool a structure in winter or summer, respectively.

Conventional geothermal well fields are drilled with wells having uniform depths and approximately 4-6 inch diameters. Field depth may vary from 75 feet (or less) to 600 feet (or more). After each well is drilled, a high density geothermal loop is then inserted to the bottom of each well.

Once the loop is in place within the well, the well is pressure-grouted, starting from the bottom of the well up to its opening at the surface of the earth. The grouting both improves thermal conductivity of the loop with the surrounding formation, and seals the well bore to prevent contamination of the surrounding geological features.

Efficiency dictates that thermal conduction of underground temperatures to the thermal conduction fluid loop be maximized. As such, the diameter (referred to as the "caliper") of the wells must be strictly controlled so that cavitating (also known as washout) of the well bore does not occur. Washout of the well bore caliper, or an unnecessary increase in the diameter of the well bore, results in a loss of the loop's ability to transfer a considerable percentage of energy. Large voids or large caliper well bores require much more annular space to be filled between the loop and the bore hole wall with grout material. This results in a loss of thermal conductance from the earth to the loop at that point.

Air Hammer Drilling

A myriad of drilling techniques are available for geothermal well production, including air hammer drilling (which is typically utilized in consolidated, e.g. Bed Rock formations), and circulating mud drilling, (which is utilized in glacial drift or overburden e.g., gravel, sand, and clay).

Air hammer drilling utilizes a rotary bit that slams against, then removes bits of, the consolidated formation being drilled. Air rotary drilling methods are almost exclusively utilized in hard consolidated formations to speed up and cut costs of drilling in bedrock. Air compressors are utilized to force air down the drill pipe through a down hole air hammer on the bottom end of the drill string. Exhaust air from the hammer evacuates the area between the drill string and the wall of the bore hole thereby lifting large volumes of water and mud out of the bore hole.

Air rotary drilling cuts through dense structures (i.e. bedrock layers) quickly, and, compared to circulating mud drilling, it is particularly useful when lost circulation occurs. This is because the air used in air rotary drilling technique tends to lift water, which seeps into the well bore (from fissures, aquifers and other voids).

Environmental containment of the drill site with air rotary drilling is very challenging. Fuel consumption of equipment utilizing this method is extremely high due to massive amounts of horse power spent producing huge amounts of air at extremely high pressures. A 6 inch diameter bore hole at five hundred ft in depth requires constant generation of up to 1000 CFM (cubic feet per minute) at 350 psi (pounds per square inch). This is twice the horse power required by mud rotary systems to drill at the same depth.

Other drawbacks to air rotary drilling include disruption of adjacent structures such as aquifers and nearby wells. As such, air hammer drilling is best utilized when wells are spaced at least 150 feet from each other.

Mud Rotary Drilling

Mud rotary drilling uses mud to carry away cuttings. FIG. 2A is a schematic of a standard drill-string 12 with mud rotary drilling in use. The down-pointing and up-pointing arrows show the direction of drilling mud, which is initially injected at the top center of the drill string. The drilling mud is pumped through the center of the drill string and out of the rotary bit 14. With continued pumping, the mud is pushed to the surface of the well bore, taking with it the bore cuttings entrained in the mud. Thus, the mud serves as a vehicle to remove bore cuttings as they are produced.

Mud rotary drilling is less disruptive to nearby geologic structures, but also less effective in penetrating dense structures even when expensive diamond bits (such as those featuring polycrystalline diamond compact (PDC) inserts) are used.

Also, mud rotary drilling stops working when large cavities develop or are encountered during drilling, inasmuch as mud pressure drops significantly in these scenarios. A subsequent drop in the return mud volume through the annulus (i.e., the space between the drill string and the sides of the well bore) results in cuttings not being carried to the surface of the hole for evacuation. This reduction of flow may generally be classified as seepage (less than 20 bbl/hr [3 m3/hr]), partial lost returns (greater than 20 bbl/hr [3 m3/hr] but still some returns), and total lost returns (where no fluid comes out of the annulus). In this severe latter case, the hole may not remain full of fluid even if the pumps are turned off. If the hole does not remain full of fluid, the vertical height of the fluid column is reduced and the pressure exerted on the open formations is reduced. This in turn can result in another zone flowing into the wellbore and a catastrophic loss of well control.

Contained mud rotary systems provide a reserve capacity for generating more mud. But, such systems usually cannot generate enough mud to overcome the aforementioned pressure and/or volume drop when large cavities are encountered in consolidated formations. At that point, the mud rotary drilling is finished, and other drilling methods must be applied.

In light of the foregoing, state of the art geothermal field development relegates the use of geothermal energy to venues able to accommodate large silt ponds, high volume water run off, and substantial scarring of the landscape associated with air hammer drilling. As such, large campuses, outlying industrial sites, or abandoned brown fields heretofore were the only candidates for geothermal well development.

Current industry standards set by The International Ground Source Heat Pump Association (IGSHPA) specifies grid pattern spacing of 10 ft to 20 ft between wells. Often, geothermal wells are 150 ft to 200 ft in depth depending on the relationship and distance from the equator. Each of these wells yield approximately one ton or 12,000 BTU of geothermal energy. Most single family homes are approximately 2000 square feet of living space. Modern built homes require from 3 to 4 ton of geothermal energy to supply heat pump load requirements. Three to four wells spaced 20 feet apartment usually can be accomplished in most rural back yards; however the much larger tonnage requirements of high rise buildings and commercial businesses make the possibility of installing geothermal well fields on sidewalks, alley ways, and parking lots a real challenge. Given that most commercial loads are a minimum of 20 to 30 tons, and therefore require a minimum of 20-30 wells, such a geothermal well field typically requires 200 to 300 foot blocks of space.

Drilling deeper wells has not been an attractive option for multiple reasons:

1. The geothermal well drilling industry has no method for assuring a consistent caliper for wells at any depth.

2. Deep well drilling results in massive amounts of water and drilling spoils (cuttings) generated during air rotary drilling. This raises environmental issues.

3. Lack of a method for competitively using mud rotary drilling in consolidated formations. Loss of mud circulation becomes particularly acute in deep drilling. State of the art mud rotary drilling methods are not effective after lost circulation zones are encountered; therefore casings must be set deep through the zone. This casing installation is neither cost effective nor easy to remove.

4. Deterioration of silica sand-based grout during air rotary drilling in deep consolidated formations. This leads to contamination of fresh water aquifers.

A need exists in the art for a system and a method for applying geothermal energy to footprints not exceeding a standard city lot. The system and method should accommodate field development on the city lot already containing a house, an ongoing commercial enterprise, or other permanent structure. The system and method should also obviate the need for completely retrofitting the HVAC of the permanent structure to utilize the geothermal energy. The method should also optimize state of the art mud rotary drilling techniques for their use in lost circulation zones.

SUMMARY OF INVENTION

An object of the invention is to provide a system and a method for utilizing geothermal energy that overcomes many of the disadvantages of the prior art.

Another object of the invention is to provide a system for utilizing geothermal energy extracted from a city-lot to supplement energy needs of permanent structures on the city lot. A feature of the invention is a means for utilizing existing HVAC systems of the structures to provide geothermal energy to the structures. An advantage of the invention is no disruption of activity within the structure during the establishment of the geothermal field, or hook up of the field to the HVAC system.

Yet another object of the present invention is to provide a method for establishing 4 to 5 tons of geothermal energy from one well, making a 30-60 ton geothermal field on 2000 square feet of real estate a possibility. A feature of the invention is enabling the drilling of a plurality of wells in close spatial relationship to each other, each well of which is approximately 300 to 700 feet deep. An advantage of the invention is that the increased depth, and therefore capacity, of each well results in a geothermal well field with a smaller foot print. This provides a means for harvesting geothermal energy from within densely packed, urban areas.

Still another object of the present invention is to provide a system for producing geothermal well fields in any formation. A feature of the invention is the primary use of rotary drilling to backfill and minimize fractures in the walls of the well bores. An advantage of the system is the minimization of environmental impact on ground surfaces, and a concomitant tight packing of geothermal wells within smaller ground footprints.

Another object of the present invention is to provide a method for producing a tightly packed well field in any geologic formation. A feature of the method is manipulation of a reverse auger in wells to repair fractures along bore walls, whereby the manipulation includes rotation of the auger, and lifting of the auger, all at speeds ultimately detrimental to above-hole equipment. An advantage of the invented method is that it allows for the establishment of working wells within a few feet of each other.

Briefly, the invention provides a system for charging an HVAC system of an existing building with geothermal energy, the system comprising an incoming flux of geothermal energy; a plurality of heat exchange surfaces adapted to receive the incoming flux of geothermal energy; and an interface between the HVAC system and the heat exchange surfaces, said interface adapted to transfer the geothermal energy to the system.

Also provided is a method for repairing aberrations along a drill bore wall, such aberrations including lost circulation zones (LCZ) in geothermal well bores, the method comprising using a rotary mud drill system to produce a drill hole, wherein the system employs a first return mud pressure value; removing the rotary mud drill when return mud pressure decreases to a second return mud pressure value; inserting a reverse auger 22 (i.e., in the case of a right-handed drilling operation, the auger 22 defines left handed flighting) into the drill hole to the point where the return mud pressure decreased to the second pressure value; actuating the auger; introducing loose substrate, (i.e. lost circulation material (LCM)) such as bentonite, into the drill hole; allowing the substrate to contact the auger 22; and lifting and lowering the auger along longitudinally extending regions of the drill hole defining the point P where the return mud pressure decreased to the predetermined value for a time and in substrate amounts sufficient to compress the substrate into that portion of the bore wall defining the lost circulation zone.

Also provided is a system for minimizing vibration of drilling equipment during production of oil, gas and geothermal well bores, the system comprising a multiplier sub for a drill rig having an above ground drive motor to form an elongated hole by dislocating solid material of the earth, the multiplier sub comprising a sleeve having a threaded male connector attached to a sleeve tube, where the sleeve tube includes an sleeve tube interior surface lined with teeth; a mandrel having a threaded female connector attached to a mandrel shaft, where the mandrel shaft is positioned within the sleeve tube and includes a mandrel shaft exterior surface lined with teeth; a first gear cluster having a plurality of first gear cluster pin gears positioned within the sleeve tube between teeth of the sleeve and mandrel; and a second gear cluster having a plurality of second gear cluster pin gears positioned within the sleeve tube between teeth of the sleeve and mandrel, where the first gear cluster is separated from the second gear cluster by an intermediate bearing, and where a teeth ratio between the sleeve the mandrel, the first gear cluster, and the second gear cluster is a value that configures the mandrel to spin at least twice as fast as the sleeve.

BRIEF DESCRIPTION OF DRAWING

The invention together with the above and other objects and advantages will be best understood from the following detailed description of the preferred embodiment of the invention shown in the accompanying drawings, wherein:

FIGS. 2A-D are schematic diagrams of a method for sealing a cavitation in a well bore, in accordance with features of the present invention;

DETAILED DESCRIPTION OF THE INVENTION

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The present invention provides a modular system to facilitate connection of existing HVAC systems to a geothermal field. Also provided is a method for establishing a high density geothermal field for use with the modular system.

System Detail

The invented preassembled pod, while stand alone in design, integrates substantially completely with existing HVAC systems. Typically, no additional permitting is necessary for installation.

Figure 1:
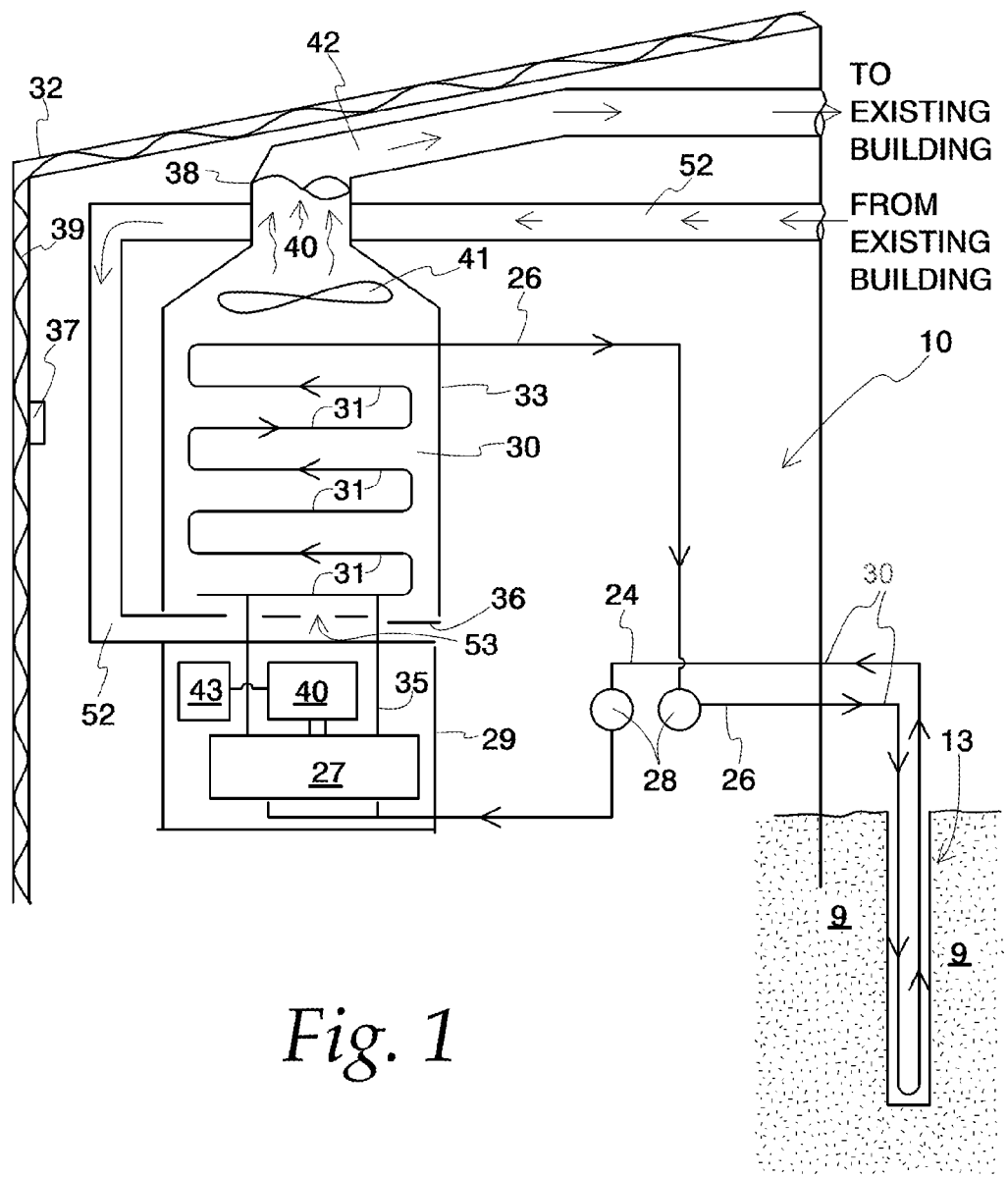
FIG. 1 is a schematic diagram of a system for integrating geothermal energy with an existing HVAC system, in accordance with features of the present invention.

FIG. 1 is a schematic depiction of the system, 10, or sub-units of the system. Salient features of the system include a means of ingress 24 and means of egress 26 of geothermal treated fluid. The fluid can be any heat exchange media. Typical fluid is enhanced water which comprises water containing rust inhibitor, antifreeze, and perhaps a balanced pH agent such as a buffer. Enhanced water is a term of art used in the geothermal industry with such enhanced water constituents dictated by the manufacturer of the particular heat pump or chiller incorporated in the system.

The means of ingress 24 establishes fluid communication between the system 10 and the fluid. The fluid traverses a closed conduit or loop 11 which in turn traverses a geothermal well 13. The loop serves as a heat exchange surface between the fluid and below-ground temperature zones. The means of egress 26 establishes fluid communication between the system 10 and the loop which redirects fluid back down the well. Both means are controlled via a flow center 28 or plurality 28 of flow centers. These flow centers comprise a (or a plurality of) first circulation pump(s) which first accept loop fluid from the geothermal well bore. The first circulation pump directs the fluid to one or a plurality of pretreatment units 27, whereby the fluid is compressed or expanded to increase or decrease its temperature, respectively.

The temperature of the fluid is compressed or expanded depending on user preference as embodied in a thermostat 37 setting.

As noted supra, a plurality of air pretreatment units 27 are in fluid communication with the flow centers 28. The pretreatment units comprise compressors or expansion chambers to either compress or expand the fluid fed from the geothermal loop to a target temperature, pursuant to the ideal gas law pV=nRT), said temperature determined by user preference.

Intermediate the pretreatment units 27 and the existing building duct work 42 is positioned a plurality of heat exchange units 30 which are encapsulated in a plenum or some other suitable housing 33. These heat exchange units 30 define a first end 36 to receive supply air and a second end 38 to exhaust thermally treated air.

As depicted in FIG. 1B, each of the heat exchange units comprises thermal conducting surfaces, 31 such as a plurality of fins reminiscent of a radiator, through which thermally treated fluid from the geothermal wells traverses. The fluid is fed to and evacuated from the fins via means of ingress 35 and egress 37, respectively. Gaps exist between the fins to facilitate air flow contact with the fins of the heat exchange units.

A means for establishing air flow across the fins is provided, such that the flow traverses from the first end 36 to the second end 38 of the heat exchange units 30. In an embodiment of the invention, the heat exchange units, and the means for establishing air flow, such as a fan 41, are contained in a plenum or other such housing.

In operation, air from the building to be heated or cooled is directed between and over the fins for a time and at a velocity sufficient to allow heat transfer between the air and the fins. In an embodiment, thermostats 37 or thermocouples are placed aft or downstream of the fins to measure the temperature of the air emanating from between the fins.

The thermally treated air 40 emanates from the second end 38 of the heat exchange units (or is otherwise drawn from the heat exchange units via a negative pressure fan 41) to be taken up by return air conduits 42, which then direct the treated air throughout the HVAC system. As such, the second end of the heat exchange units is situated between the first ends and the return air conduits.

A spent air stream conduit 52 directs depleted air from an egress point of the HVAC system and directs the depleted air back to the first end 36 of the heat exchanger for cooling or heating. A means 53 for supplying fresh air to the first end 36 is also provided.

Fin 31 temperature is controlled by flow rate of incoming and outgoing loop fluids, as determined by flow controllers 40. The flow controllers 40 are in turn monitored by thermostats set at predetermined temperatures. In one embodiment, the flow centers 28, heat pumps 27, and flow controllers 40 are all digitally controlled via a user's thermostat setting.

The entire assembly is contained in a shell or housing 32 which is insulated from the ambient environment to assure maximum heat transfer between the loop fluid and the fluid which will course through the HVAC system or radiant heating system of the structure to be heated and/or cooled. In the case of HVAC systems, the fluid will be air. The air may be pretreated (such as humidified) prior to or during its dispersal through the HVAC system.

In the case of radiant heating systems, the fluid may be water. In one embodiment, the fluid is the enhanced water, discussed supra. In this instance, the enhanced water traverses the already existing water coils of the building's radiant matrix. As such, the fluid-to-air temperature heat exchange units 30 found in the aforementioned fluid to air systems are not utilized.

Housing 32 fabrication materials 39 further provides a means to minimize thermal communication between the inside of the housing and the ambient (i.e. exterior) environment. The ambient environment is construed in this specification to be the air existing at atmospheric pressure and temperature external to the outside of the housing 32. Generally, the housing's fabrication materials 39 provide R ratings appropriate for the temperature zone in which the assembly is located, and as mandated by local building codes. As such, the housing 32 serves as a means to minimize thermal conduction between its interior and the ambient environment. The housing, 32, perhaps embodied as a shed or lean-to attached to an existing structure, also provides a physical barrier to any activity external of it.

The fully insulated geoutility pod system may include the following components:

1. Geothermal heat pumps. Generally, for a typical 3-4 ton load, a heat pump, 27, or a plurality of heat pumps, should be able to move three gallons per ton per minute of geothermal treated fluid. Fluid pressures of from 22 to 32 psi are suitable. Suitable heat pumps are commercially available from a myriad of supply companies, including those manufactured by Climate Master of Oklahoma City, Okla. Insulation placement shall be designed in a manner that may eliminate any exposed edges to prevent the introduction of glass fibers into the air stream.

2. Vertical heat pumps also may be required. These vertical heat pumps provide configurations whereby supply lines (i.e., their exhaust lines) emanate from the top (i.e., superior regions) of their housing while return lines enter their housing from either vertically-disposed side of the housing. Suitable vertical heat pumps are commercially available from such supply outlets as Climate Master (referenced supra), Trane (Tyler, Tex. and Piscataway, N.J.) and Ingersoll Rand (Montvale, N.J.).

3. The hot water system. Commercially available units (such as the flexible R Series® Chillers, manufactured by Trane, of Piscataway, N.J.) are adapted to receive incoming water at a temperature range from 20° to 110° F. (−6.7° to 43.3° C.) as standard. These are relatively large heat pumps.

4. Refrigerant to air heat exchangers.

5. A solar, wind or fuel cell systems to provide electricity to the circulating pumps.

6. Any batteries, inverters, etc that are needed to store energy derived from the solar, wind or fuel cell systems.

7. As an option, the geoutility pod system may also have an Energy Management system (EMS) that may monitor usage and savings via the internet.

Heat Exchanger Detail

The heat exchange 30 units comprise a sealed refrigerant circuit including a high efficiency scroll, rotary or reciprocating compressor designed for heat pump operation, a thermostatic expansion valve for refrigerant metering, an enhanced corrugated aluminum lanced fin and rifled copper tube refrigerant to air heat exchanger (such as that depicted as elements 31 in FIG. 1B), reversing valve, coaxial (tube in tube) refrigerant to water heat exchanger, and safety controls including a high pressure switch, low pressure switch (loss of charge), water coil low temperature sensor, and air coil low temperature sensor. Access fittings installed on high and low pressure refrigerant lines facilitate field service. Activation of any safety device prevents compressor operation via a microprocessor lockout circuit. The lockout circuit resets at the thermostat or at the contractor supplied disconnect switch.

In an embodiment of the invention, refrigerant to air heat exchangers utilize enhanced corrugated lanced aluminum fins and rifled copper tube construction rated to withstand 450 PSIG (3101 kPa) refrigerant working pressure. Refrigerant to water heat exchangers preferably comprise copper inner water tube and steel refrigerant outer tube design, rated to withstand 450 PSIG (3101 kPa) working refrigerant pressure and 450 PSIG (3101 kPa) working water pressure.

Refrigerant metering can be accomplished by thermostatic expansion valves. Suitable expansion valves include dual port balanced types with external equalizer for optimum refrigerant metering. Suitable units are designed and tested for operating ranges of entering enhanced water temperatures from 20° to 110° F. (−6.7° to 43.3° C.). Suitable reversing valves include four-way solenoid-activated refrigerant valves, which default to heating mode in the event of solenoid failure. If the reversing valve solenoid defaults to cooling mode, an additional low temperature thermostat is preferably provided to prevent over-cooling an already cold room.

Electrical System Detail

A control box 43 is in electrical communication with the flow center 40 and the unit compressor 29 compartment and shall contain a 50VA transformer, 24 volt activated, 2 or 3 pole compressor contactor, terminal block for thermostat wiring and solid-state controller for complete unit operation. Reversing valve and fan motor wiring are routed through this electronic controller. Units shall be name-plated for use with time delay fuses or HACR circuit breakers. Suitable unit controls are 24 Volt and provide heating or cooling as required by the remote thermostat/sensor.

Solid State Control System (CXM):

Preferably, the system operates via a solid-state control system embodied in the control box 43 and the flow center 40. The control system microprocessor board protects against building electrical system noise contamination, EMI, and RFI interference. The control system interfaces with a heat pump type thermostat. The control system has the following features:

a. Anti-short cycle time delay on compressor operation;
b. Random start on power up mode;
c. Low voltage protection;
d. High voltage protection;
e. Unit shutdown on high or low refrigerant pressures;
f. Unit shutdown on low water temperature;
g. Condensate overflow electronic protection;
h. Option to reset unit at thermostat or disconnect;
i. Automatic intelligent reset. For the sake of illustration, the unit may automatically reset five minutes after trip if the fault has cleared. If a fault occurs three times sequentially without thermostat meeting temperature, then lockout requiring manual reset may occur;
j. Ability to defeat time delays for servicing;
k. Light emitting diode (LED) on circuit board 43 to indicate high pressure, low pressure, low voltage, high voltage, low water/air temperature cut-out, condensate overflow, and control voltage status;
l. Optionally, the low-pressure switch is monitored for the first 120 seconds after a compressor start command to prevent nuisance safety trips;
m. 24V output to cycle a motorized water valve or other device with compressor contactor;
n. Unit Performance Sentinel (UPS). The UPS warns when the heat pump may be running inefficiently;
o. Water coil low temperature sensing (selectable for water or anti-freeze);
p. Air coil low temperature sensing.

The invented unit provides the eight safety protections of anti-short cycle, low voltage, high voltage, high refrigerant pressure, low pressure (loss of charge), air coil low temperature cut-out, water coil low temperature cut-out, and condensate overflow protection.

Enhanced Solid State
Control System Detail

This control system features two stage control of cooling and two stage control of heating modes for exacting temperature and dehumidification purposes.

This control system coupled with a multi-stage thermostat may better dehumidify room air by automatically running the heat pump's fan at lower speed on the first stage of cooling thereby implementing low sensible heat ratio cooling. On the need for higher cooling performance, the system optionally activates the second stage of cooling and automatically switches the fan to the higher fan speed setting. This system may be further enhanced with a humidistat. Units not having automatic low sensible heat ratio cooling may not be accepted; as an alternate, a hot gas reheat coil may be provided with control system for automatic activation.

Control shall have all of the above mentioned features of the CXM control system along with the following expanded features:

a. Removable thermostat connector;
b. Night setback control;
c. Random start on return from night setback;
d. Minimized reversing valve operation (Unit control logic shall only switch the reversing valve when cooling may be demanded for the first time. The reversing valve is held in this position until the first call for heating, ensuring quiet operation and increased valve life.);
e. Override temperature control with 2-hour (adjustable) timer for room occupant to override setback temperature at the thermostat;
f. Dry contact night setback output for digital night setback thermostats;
g. Ability to work with heat pump or heat/cool (Y, W) type thermostats;
h. Ability to work with heat pump thermostats using O or B reversing valve control;
i. Emergency shutdown contacts;
j. Boilerless system heat control at low loop water temperature;
k. Ability to allow up to 3 units to be controlled by one thermostat;
l. Relay to operate an external damper;
m. Ability to automatically change fan speed from multi-stage thermostat;
n. Relay to start system pump;
o. 75 VA control transformer. Control transformers feature load side short circuit and overload protection via a built in circuit breaker.

Remote Service
Sentinel Detail

A solid state control system communicates with thermostats to display (at the thermostats) the unit status, fault status, and specific fault condition, as well as retrieve previously stored fault that caused unit shutdown. The Remote Service Sentinel allows building maintenance personnel or service personnel to diagnose unit from the wall thermostat. For example, the control board may provide a signal to the thermostat fault light, indicating a lockout. Upon cycling the fan input 3 times within a 60 second time period, the fault light shall display the specific code as indicated by a sequence of flashes. A detailed flashing code may be provided at the thermostat LED to display unit status and specific fault status such as over/under voltage fault, high pressure fault, low pressure fault, low water temperature fault, condensate overflow fault, etc.

Embodiments of the invented system contain most of the features listed above (either CXM or DXM). The control board is supplied with an interface board to permit all units to be daisy chained via a 2-wire twisted pair shielded cable. Preferably, the following data points are available at a central or remote computer location:

a. space temperature;
b. leaving water temperature;
c. discharge air temperature;
d. command of space temperature setpoint;
e. cooling status;
f. heating status;
g. low temperature sensor alarm;
h. low pressure sensor alarm;
i. high pressure switch alarm;
j. condensate sensor alarm;
k. In/low voltage alarm;
l. fan "ON/AUTO" position of space thermostat as specified above;
m. unoccupied/occupied command;
n. cooling command;
o. heating command;
p. fan "ON/AUTO" command;
q. fault reset command;
r. itemized fault code revealing reason for specific shutdown fault (any one of 7)

A myriad of thermostats are available for use with the unit, including mechanical or electronic types. For example, single stage standard manual changeover units are suitable in less complex installations. However, for more complex systems, remotely monitored, and/or remotely actuated, thermostats may be suitable.

Urban Well Drilling
And Sealing Detail

The development and application of the aforementioned system is less significant without applying the following invented method for increasing geothermal flux in small, already established areas, such as city lots.

The method allows drilling into consolidated formations using rotary mud drilling technologies and solves the lost circulation problems such formations usually present in rotary mud operations.

Specifically, the invention provides a method for repairing aberrations (often referred to as "fractures") along a drill bore wall, the method comprising: using a rotary mud drill system to produce a drill hole, wherein the system employs a first return mud pressure value; stopping the rotary mud drill system when return mud pressure decreases to a second return mud pressure value at a point P in the drill hole; positioning a reverse auger 22 into the drill hole at said point; rotating the auger; introducing loose substrate "S" into the drill hole so as to cause said loose substrate to contact the auger; lifting and lowering the auger along longitudinally extending regions of the drill hole defining the point and/or above the point P for a time and in substrate amounts sufficient to minimize the aberrations; and reestablishing the first return mud pressure of the rotary mud drill system to extend the length of the drill bore below said point. In one embodiment of the method, the middle of the auger is placed opposite the point P where fracture has occurred and is both rotated and moved up and down, while substrate S is fed from above. In this instance, substrate S is directed into the fracture point P before it rolls down the auger flights past the fracture point. Generally, depending or downwardly facing surfaces of the auger flights force the substrate down into the deepest recesses of the bore, as depicted in FIG. 2C.

A salient feature of the method for increasing well flux (i.e., either the number of wells, the depth of wells, or both) is the use of a reverse auger system during the drilling process. The reverse auger is defined as containing left handed flights in the case where the auger is rotated in a right-hand direction. Such a left-handed flight configuration is depicted in FIG. 2C.

Right rotation is the drilling standard. However, opposite flighting (i.e., an auger having right handed flights) is suitable when the drill string operations, and therefore the auger is rotated in a left hand direction. FIGS. 2A-D provide a schematic sequence of this invented method, wherein right-hand rotation is utilized.

The rotational speed and the downward force (weight on bit) applied is dependent on conditions at the point of contact of the bit to the structure (e.g. the composition of the consolidated structure, the type of bit, etc). For example, the mud circulation rotary drill bit boring into limestone might be operated at a bit rpm of 150 rpm to 170 rpm with 1000 pound per square inch of weight on the bit (which is empirically proven to be effective). Drilling with a tricone bit generally operates optimally at a rotational speed of about 30 rpm. Accordingly, drilling a pilot hole into bedrock is performed only when deemed absolutely necessary, and then only for the depth required.

It should be noted that given the hardness of bedrock, and the aforementioned difficulty/expense associated with using mud rotary drilling techniques to penetrate bedrock, the inventor has devised a pilot hole method for facilitating drilling. Briefly, a tricone drill bit (e.g. a Tri-Cone™ bit as distributed by Baker Hughes, Houston, Tex.) is used to first drill a pilot hole into the bedrock. Then, drilling with the circulating mud/rotating drill bit drilling process can commence and/or resume.

Figure 2A:
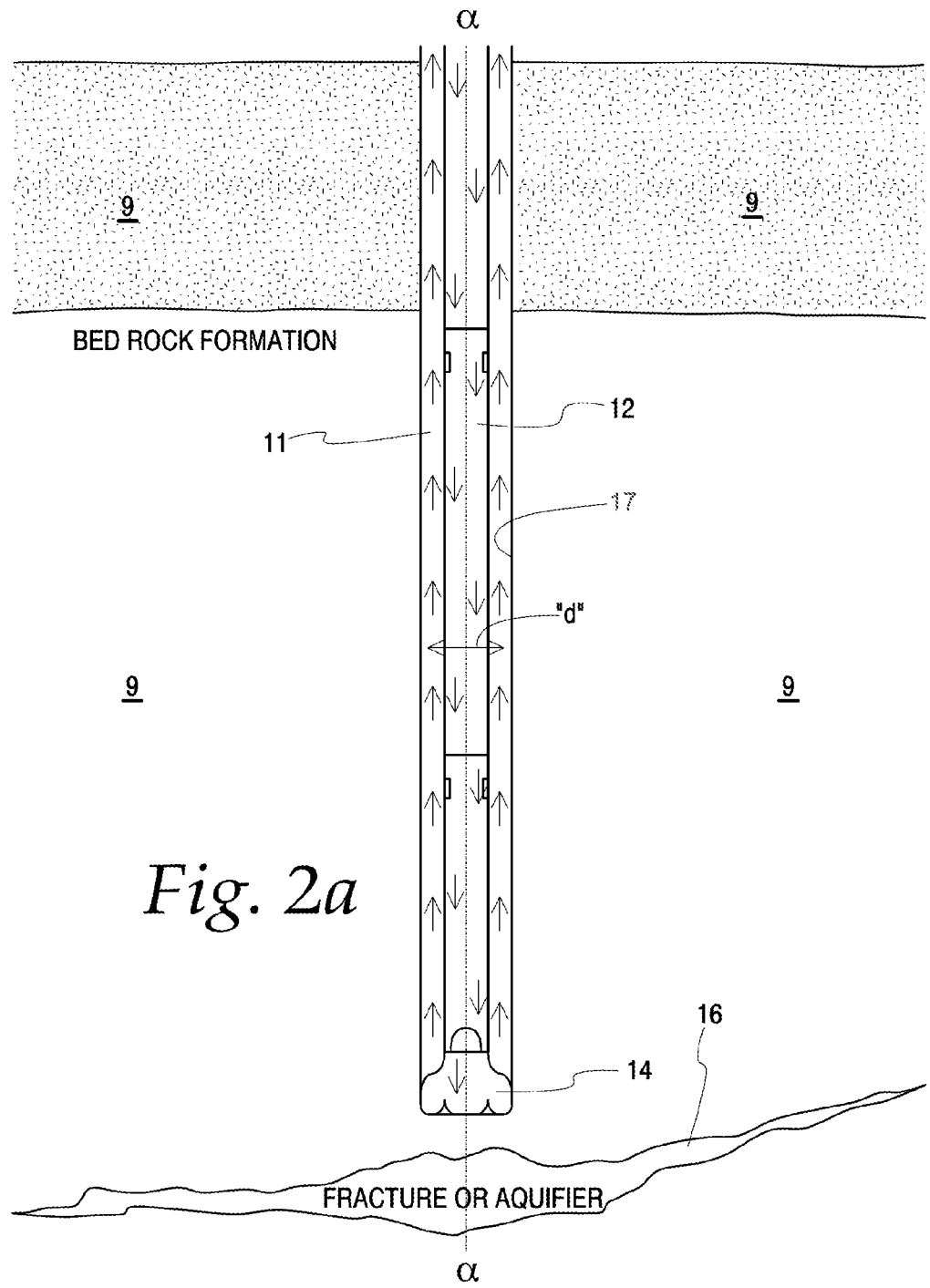

Often, in bedrock formations, fractures 16 exist, the fractures often situated in a transverse disposition to the longitudinal axis α of the well bore. FIG. 2A shows the rotary bit 14 not yet deep enough to reach the fracture.

As can be noted in FIG. 2A, a predetermined distance defining an annular space should be maintained between the walls 18 of the drilled hole and the drill string surface. The annular space is critical with utilizing mud rotary drilling. This space between the drill pipe string and the wall of the hole being bored must be sufficient to allow drill cuttings to be pumped away from the drill bit and carried back to surface. Any obstruction to this annular space will stop the drilling procedure and can result in loss of thousands of dollars in drilling bits and drill pipe. If the annular space is allowed to become inconsistent or 'washed out", then the mud flow to surface is no longer constant with a steady rate. Drill cuttings start to build up around the drill string causing a similar loss of the drill bit and/or drill string. As such return mud must be constantly monitored for pressure, flow rate and amount of drill cuttings being carried back to surface.

Tight calipers (i.e., small variation in the diameter of the well bore), assure a tight packing of the geothermal loop within the hole and therefore more efficient transfer of geothermal heat from the bedrock and the loop. A well bore diameter "d" between about 3 inches and 10 inches is suitable, with "d" between about 4 and 6 inches as preferable.

Figure 2B:
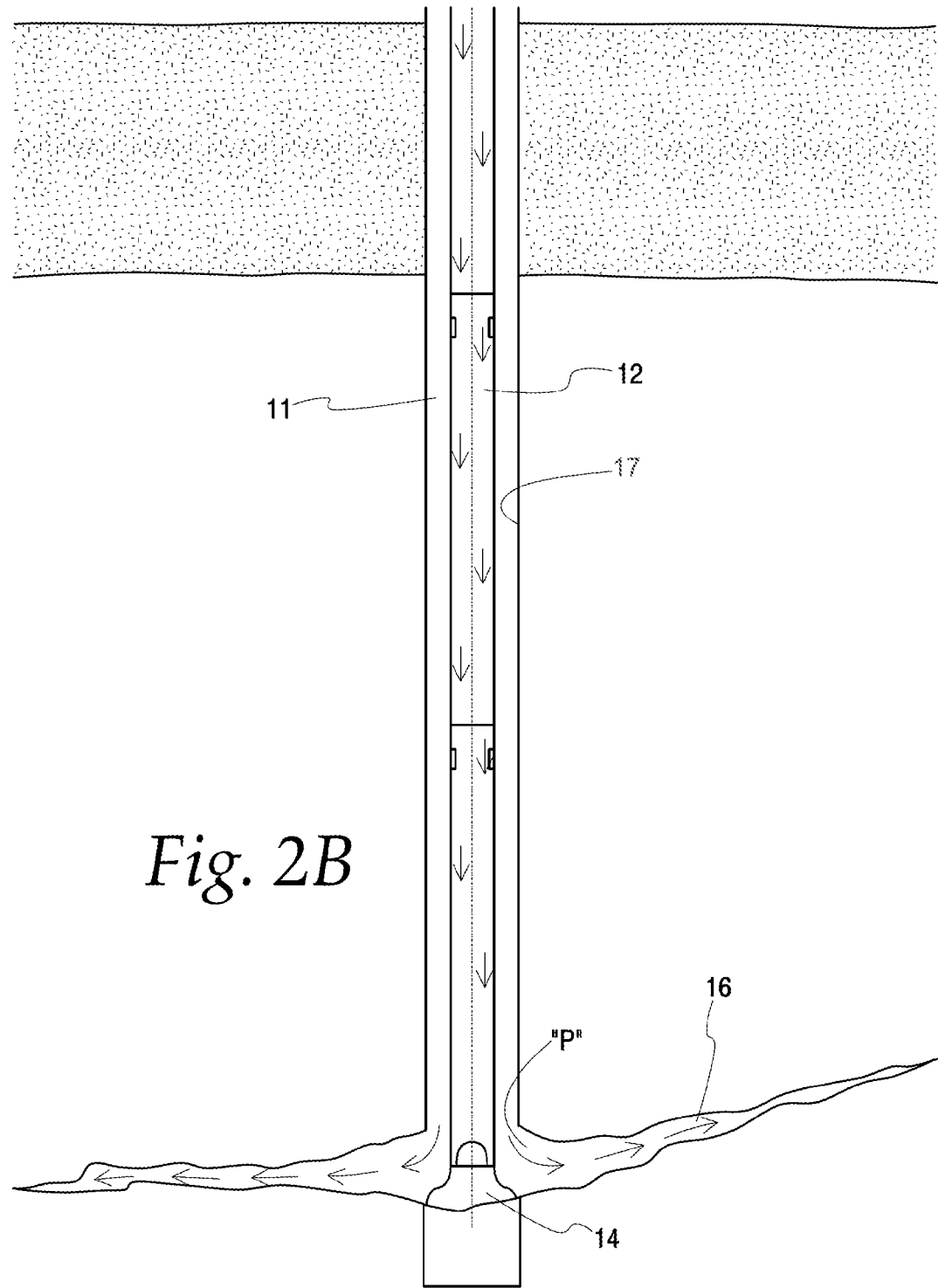

FIG. 2B depicts the rotary bit 14 piercing the ceiling of the fracture 16. Upon such an event, a portion of the drill mud spills into the fracture, as the downward and laterally pointing arrows show. A loss of mud pressure occurs, and if the fracture is large enough, drilling must cease. In typical situations, the drilling operator either chooses to stop the depth at that point "P" of the drill bore, or else drills another hole.

FIG. 2C depicts the invented reverse auger method in operation. In this scenario, the operator, upon experiencing mud pressure loss, backs the drill string out of the hole, and replaces the rotary bit 14 with an auger defining a left hand flighting. This auger when rotated to the right, provides a means for forcing aggregate downward, thereby pushing aggregate into the fracture site, 16.

Once the appropriate auger is in place and turning as designated supra, aggregate such as bentonite chips are poured from above into the annular space defined by the walls 18 of the drilled hole and the drill string 12 to which the auger is placed. During insertion of the aggregate, the auger is raised and lowered while also being turned. Continual up and down movement of the auger causes the aggregate to work its way into the formation at the facture point P. Essentially, the substrate, falling from above, is manipulated by the auger so as to be below the flights of the auger. As such, when the auger is turned, the substrate is forced in one direction (downward), with nowhere else to go but into the fractures. In an embodiment of the invention, the auger prevents upward migration of the substrate.

The combination of the raising and lowering of the auger along the longitudinal axis of the bore hole, plus its rotation (between about 1 and 200 rpm) forces the bentonite against the walls 18 and into the fracture 16 of the drilled hole. Rotation speed will vary, depending on the size of the void or fracture being filled and the amount of pressure required to force materials into the voids or fractures.

In one embodiment of the method, the turning of the auger directs substrate downwardly. When the depending end of the auger is in close spatial relationship to the bottom of the bore, (which may be the case if mud rotary operations are stopped soon after pressure loss occurs), then the substrate is forced into the fracture space which surrounds the bottom of the bore. In this instance, the auger is moved upwardly from a first position in the bottom of the bore hole (i.e., from the fracture point P). The auger, upon being raised to a second position, or end point of its longitudinal movement. The auger is then moved back down to its first position. Movement of the auger may be stopped between the first and second points (i.e., at an intermediate point), particularly in instances where aggregate has completely filled or temporarily overloaded the flights of the auger and the aggregate is in the process of being compacted into the fracture point P situated below the auger at that intermediate point.

The raising and lowering of the auger, combined with the bentonite, also serves to smooth close the fracture site, particularly as the blades of the auger are in close proximity to the walls of the bore. In one embodiment of the method, the overall diameter of the auger is chosen such that only about 2-3 inches clearance exists between the radially projecting flights of the auger blade and the bore wall.

Figure 2D:
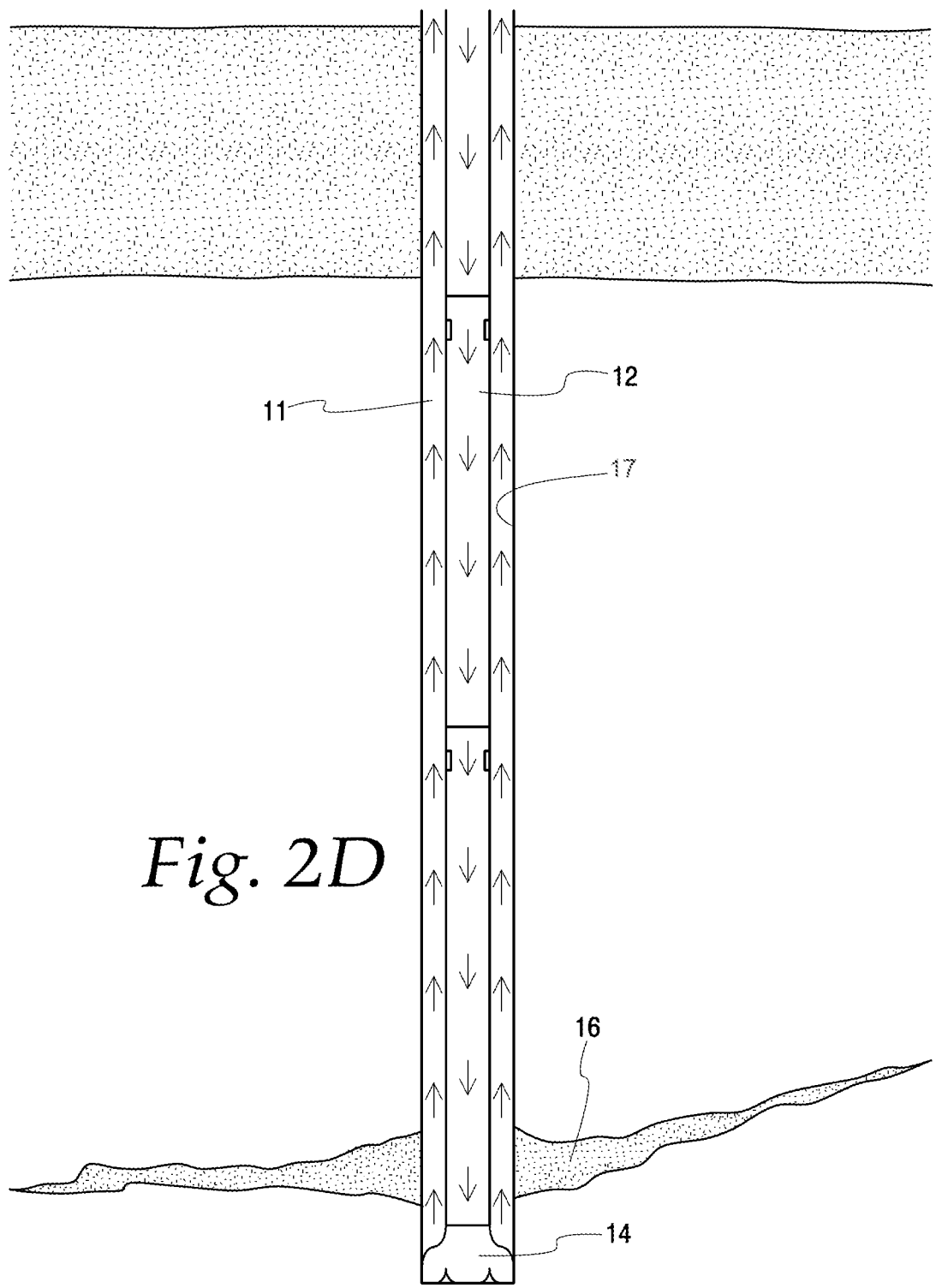

Eventually, the aggregate fills the void created. This is depicted in FIG. 2C. After the fracture 16 is sealed, the drill string is pulled out, the auger is replaced by the rotary drill bit 14, and drilling continues, as depicted in FIG. 2D.

The inventor has discovered that the auger manipulations necessary to fill fractures are multi-directional and often simultaneous with each other. For example, it is not uncommon for the reverse auger to be raised and lowered along the fracture point P several times a minute, while the auger is rotating at the speeds mentioned supra. Ultimately, these manipulations will stress above-hole structures. As such, many of the manipulations are not attainable and/or sustainable with conventional equipment. Rather, a multiplier-sub arrangement may be required, that arrangement disclosed infra. The multiplier-sub is a below ground connection to the drill string that allows the end of the string to rotate and speeds which are multiples of the speed that the above-hole drill string rotates. For example, while the drill string rotation above the hole is 20 rpms, the rotation at the site of fracture may need to be faster than 20 rpms.

Furthermore, it should be appreciated that a breach in a well bore wall should be addressed sooner than later. As such, the auger-multiplier sub combination should be applied on site immediately. Otherwise, in-flows from the formation may cause collapse of the well, or slow but dangerous pressure build up of fluids, which ultimately will breach the surface of the well and cause environmental issues. In operation of an embodiment of the reverse auger method, the multiplier sub is removably attached to the reverse auger and in between the derrick and the reverse auger. The auger is mated with the depending end of the multiplier-sub in a standard male/female threaded configuration, similar to how sections of drill string are attached.

The reverse auger system facilitates heretofore unattained production of deep geothermal wells (wherein "deep" is construed herein to be at least 300 feet).

EXAMPLE

Figure 3A:
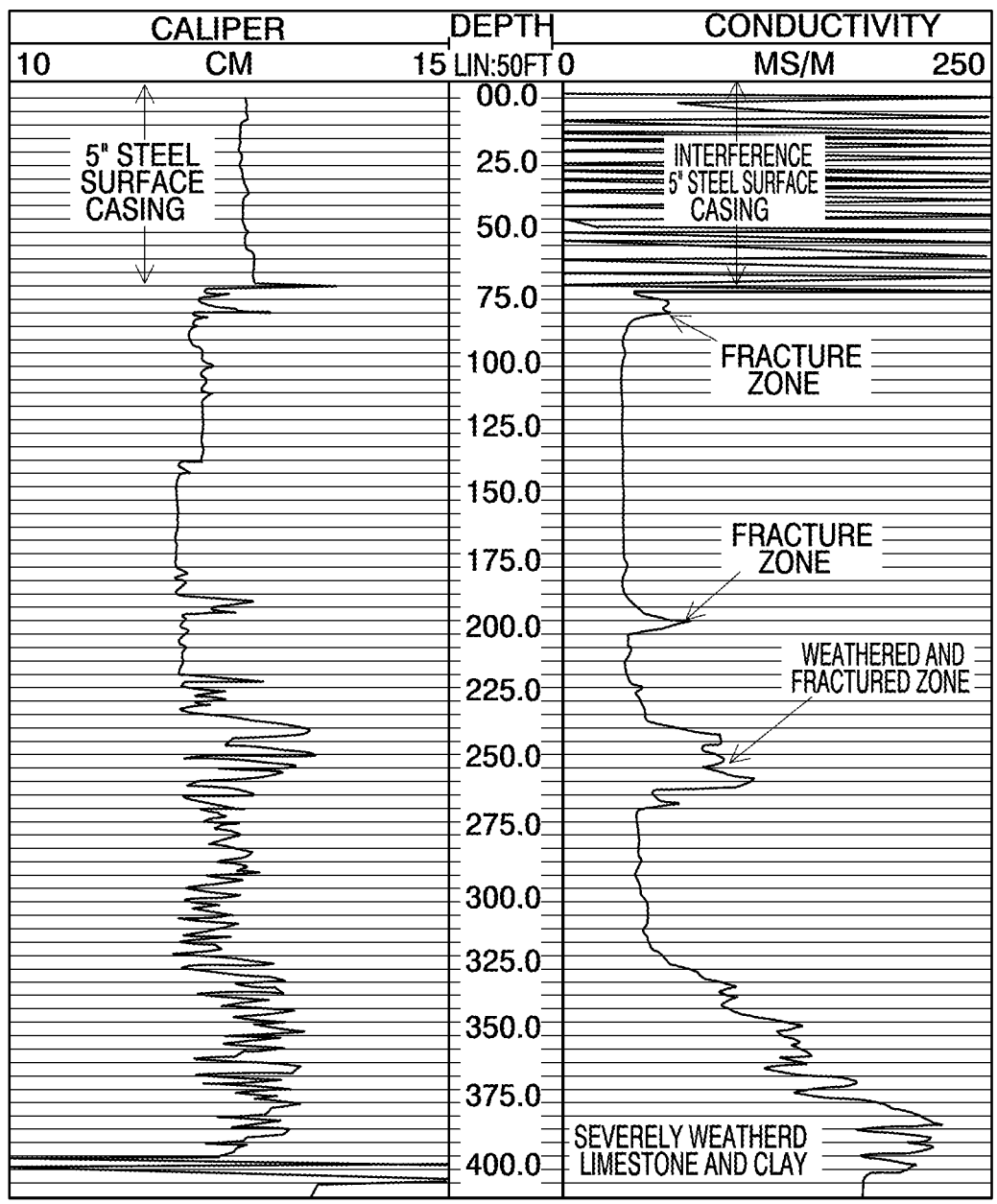
FIGS. 3A-B depict caliper logs comparing borings made by the invented process to borings made via state of the art processes.
Figure 3B:
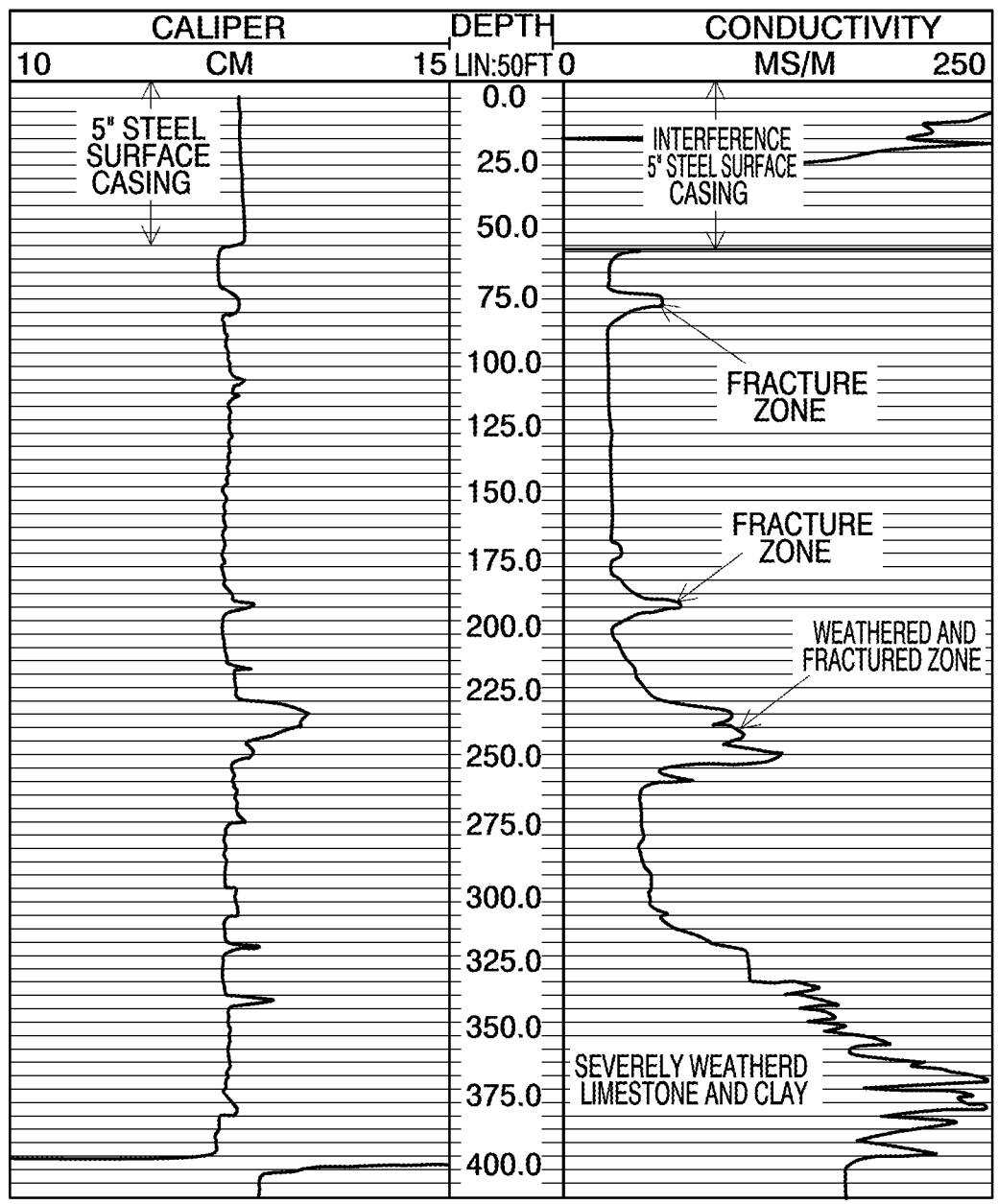
Figure 4:
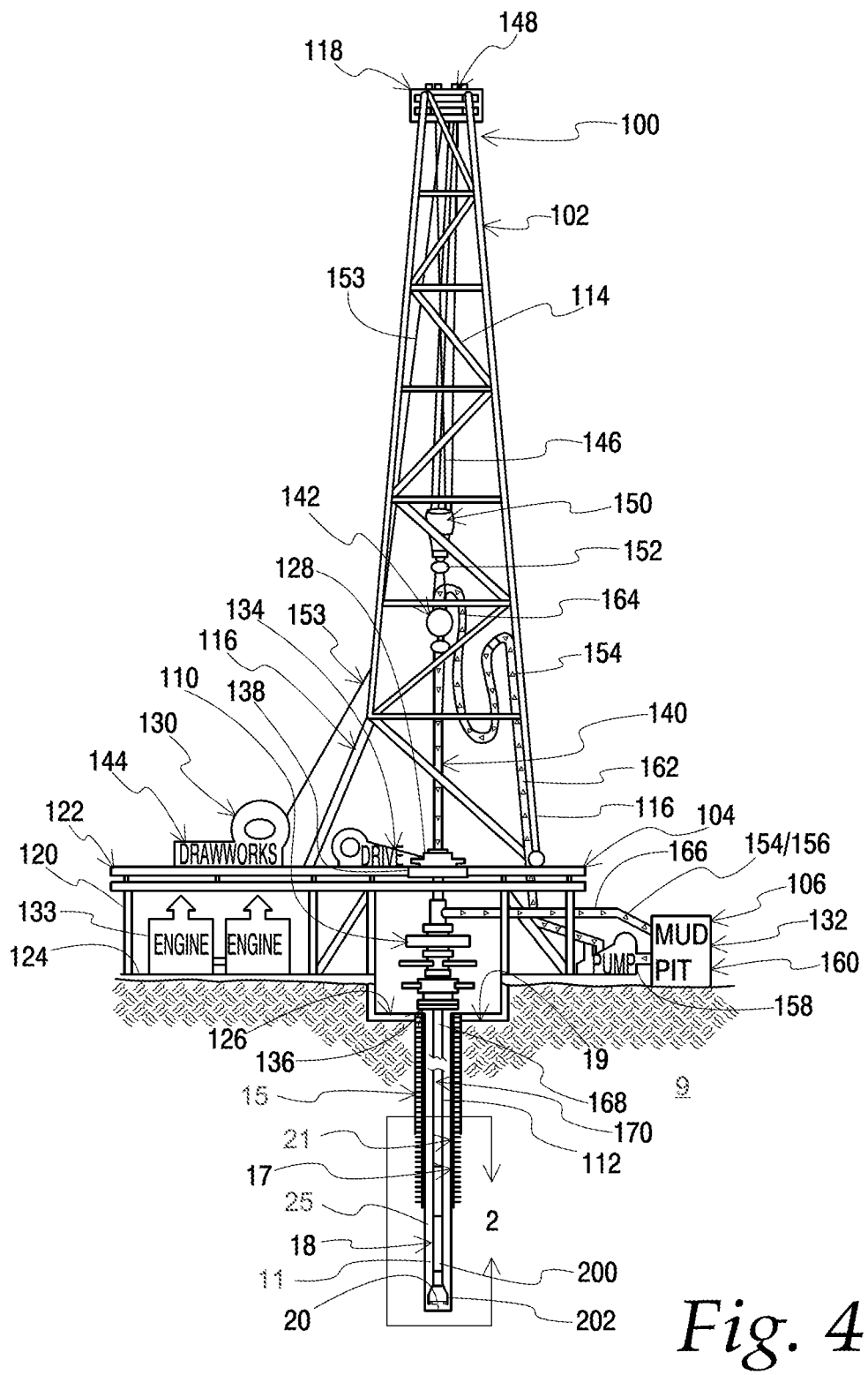
FIG. 4 is an elevated view of a drilling derrick.

FIGS. 3A and 3B are caliper logs depicting a location where fractured formation and lost circulation zones are an issue. The logs depict fracture zones at depths of 195 feet, 250 feet and 375 feet. These two holes were drilled 100 feet from each other, on the same day.

FIG. 3A is a caliper log for a hole drilled using conventional drilling techniques. From a 180 foot depth, a mud rotary was switched to air rotary due to the driller encountering the fractured formation. Caliper deviations (i.e., washout) seen on that graph are concomitant with lost circulation.

FIG. 3B is a caliper log for a hole drilled approximately 100 feet away using the invented technique. When the invented reverse auger process was applied at the first instance of mud pressure drop, the fractures sealed, or at least were greatly minimized. The reverse auger method was used in this drilling at between 180 and 260 feet. Upon repair of the fractures, the mud circulation was reestablished. Unlike the well depicted in FIG. 3A, the well was completed using mud rotary techniques.

The well which resulted in the caliper log depicted as FIG. 3B provided a more uniform diameter for calculating group specification. The results in more efficient geothermal energy conductivity from the formation to the loops. Also, less spoils are produced, therefore minimizing environmental remediation activity.

Application of the invented reverse auger process resulted in a washout of only 20 percent for the bore produced with the invented method FIG. 3B, versus 400 percent washout for the bore produced with standard methods (FIG. 3A). This means that the bore produced with standard methods has a four-fold variance in bore diameter throughout its length, versus a variance of approximately 0.2 for the bore produced with the invented method.

Aggregate/Grout Detail

As to the reverse auger process described supra, a myriad of aggregate types are suitable, including but not limited to clays, red mud, cement, asphalt, polymers such as bentonite, volcanic clay material, and combinations thereof.

Selection of the aggregate types depends on the type of void experienced. Generally, aggregate sizes of between 1/4" and 1/2" are suitable. Preferably, if the fracture comprises mainly an aquifer, then preferably bentonite, supplied as 3/8 inch chips is suitable inasmuch as it swells upon contact with water. If the fracture is nothing more than a void, then diatomaceous earth is also suitable.

Thus, bentonite or an alternative grout is extruded into the fracture. Most geothermal collection fields are artesian and thus bentonite grouts are nearly ideal sealants. That is, bentonite grouts are flexible and do not shrink and crack when hydrated, thus creating a low permeability seal. Also, bentonite grouts are chemically inert, and have generally low impact to the environment, persons, equipment, and water quality. Of course in situations where excessive chlorides or other contaminants such as alcohols or ketones are present, grouts other than bentonite may be used. At the completion of the sealing operation (when the grout has hardened) the process returns to once again preparing the mud extruder. With the fracture now sealed, pressure can be maintained at a maximal level (e.g., the first return mud pressure value) so that the bit may be advanced beyond the fracture.

Optionally, bridging agents are mixed with aggregates in cases where fractures or cavities experienced in the structure are large. Different bridging agents are suitable for different situations. In these instances, material of a coarse, fibrous or flaky composition are first applied with the auger to form an impermeable barrier across a formation interface or perforation. Such coarse bridging materials are most commonly used when lost circulation occurs during drilling. Then, bentonite, or some other final sealing material is applied, also via the auger. Examples of the bridging materials include, but are not limited to bulk cellulose materials, cotton seed hulls, and manmade materials such as Microflake® from Halliburton, or sodium carboxymethyl cellulose such as Cellex Pac, provided by Baroid (Houston, Tex.).

Other agents are utilized to bridge and seal formations with low to moderate porosity and permeability. These solids are added to the aggregate in amounts sufficient to build a filter cake across the pore throat of fractures. These bridging agents include, but are not limited to acid soluble materials (e.g. calcium carbonate), water soluble materials (e.g. salt such as sodium chloride), water absorbing (e.g. cellulose) or oil soluble resins. Lost circulation material such as mica, nutshells, fiber, diatomaceous earth, is also a suitable addition to the aggregate.

Multiplier-Sub Detail

FIG. 1 is an elevated view of a drill rig 100. Drill rig 100 may be a machine system having tools and accessory equipment to create shafts and/or boreholes 10 in a ground 12. Drill rig 100 may include mobile equipment mounted on trucks, tracks, or trailers residing on ground 12, or may be attached to ground 12, sometimes as a marine-based structure. In general, drill rig 100 may include the complex of equipment used to penetrate the surface of the earth's crust, which may include a stack of rock layers interspersed with water, oil, and/or gas.

Drill rig 100 may include a derrick 102, a substructure 104, operation systems 106, blowout prevention equipment 110, and a drill string 112 having a drill bit 202. Derrick 102 may reside on substructure 104 and drill rig 100 may fix substructure 104 to ground 12. Operation systems 106 may reside below, around, and above substructure 104. Drill rig 100 may fix blowout prevention equipment 110 to ground 12 about borehole 10. Drill rig 100 may position drill string 112 within borehole 10 and may connect drill string 112 to operation systems 106 through blowout prevention equipment 110.

In operation, operation systems 106 may rotate drill string 112 from a top end to construct borehole 10. Borehole 10 may include cement 14 surrounding a casing 16. The system may use cement 14 to fill the space between a wall 17 of borehole 10 and casing 16. Casing 16 may be heavy steel pipe that lines the walls of borehole 10. Together with cement 14, this prevents wall 17 of borehole 10 from caving in, prevents movement of fluids (water, oil, or gas) between rock layers, confines production to wellbore 10, and provides a way to control pressure utilizing blowout prevention equipment 110.

Casing 16 may surround a borehole cavity 18. Borehole cavity 18 may be an empty space within casing 16 that extends from blowout prevention equipment 110 at a borehole cavity top 19 to a borehole cavity bottom 20. The distance between blowout prevention equipment 110 and borehole cavity bottom 20 typically is about 15,000 feet (4.6 km) long for an oil or gas well vertically drilled onshore. The excess in the diameter of borehole cavity 18 over a diameter of drill string 112 is an overgauge 22. Overgauge 22 may be an annular gap whose distance may vary vertically along borehole cavity 18. Overguage 22 may be a passageway to allow drilling mud fluid 154 to carry fragmented cuttings 156 from borehole cavity bottom 20 to blowout prevention equipment 110. During the process of drilling, drill rig 100 continuously circulates pressurized drilling fluid (mud) down a center of drill string 112, out of holes in drill bit 202 at the bottom of drill string 112, and back up to the surface via the overgauge 22 space between the rotating drill-string 112 and casing 16. The circulated drilling mud 154 cools and lubricates drill bit 202 as well as to remove cuttings 156 produced by drill bit 202.

As noted above, drill rig 100 may include derrick 102. Derrick 102 may be a large load-bearing structure arranged as a bolted construction of metal beams 114. As a framework erected over borehole 10 to allow drill rig 100 to lift-up and lower drill tubes, derrick 102 may include four derrick legs 116 residing on substructure 104 and a derrick crown 118 as a topmost part of derrick 102 to form an upstanding mast. Derrick 102 may be pyramidal in shape, extend from 30 to 60 meters above substructure 104, and offer a good strength-to-weight support ratio.

Substructure 104 may be an assembly of heavy substructure beams 120 supporting a substructure platform 122 above ground 12. Drill rig 100 may use substructure 104 as a foundation to elevate derrick 102 and provide space underneath. Drill rig 100 may utilize this space underneath to install equipment for operation systems 106 on a cellar deck 124 and to install blowout prevention equipment 110 adjacent to a wellhead 126. Wellhead 126 may be an area immediately surrounding borehole cavity top 19.

Operation systems 106 may be an arrangement of power controlling devices utilized to impart electrical, mechanical, and other energy into drill rig 100. Operations system 106 may include a rotary system 128, a hoisting system 130, and a drilling mud circulation system 132. In addition, operations system 106 may include engines 133. Engines 133 may include any of various types of power units such as a hydraulic, internal combustion, air, or electric motor that develops energy or imparts rotary motion to power other machines.

Rotary system 126 may impart controlled rotational motion into drill string 112. Rotary system 126 may include a rotary drive 134, a rotary head 136, a rotary table 138, a kelly drive 140, and a swivel 142. Drill rig 100 may connect kelly drive 140 between swivel 142 and rotary table 138. In addition, drill rig 100 may secure rotary drive 134 to substructure platform 122, may connect rotary table 138 to rotary drive 134, and may connect rotary head 136 adjacent to borehole cavity top 19.

Rotary drive 134 may be a machine utilized to impart rotational power to drill string 112 while permitting vertical movement of pipe for drilling. Rotary drive 134 may include a rotary/master bushing to turn a kelly drive bushing to permit up and down movement of kelly drive 140 while the drill pipe 170 is turning.

Rotary head 136 may provide a reasonably tight seal at the top of well pipe casing 16 while permitting kelly drive 140 to rotate therein. Drill rig 100 may provide rotary head 136 with a 16-inch diameter pipe secured to a conductor pipe of casing 16. Rotary head 136 may facilitate handling drilling mud flowing upward through casing 16.

A kelly tool may be a heavy square, hexagonal or octagonal shaped tubing member suspended from swivel 142 through rotary table 138 and connected to a topmost section of drill pipe 170 to turn drill pipe 170 as rotary table 138 turns. The upper end of the kelly is screwed into swivel 142, usually using a left-hand thread to preclude loosening from the right-hand torque applied below. The kelly tool fits into the kelly bushing—a mechanical device that turns the kelly when rotated by rotary table 138. Together, the art refers to the kelly and the kelly bushing as kelly drive 140. Kelly drive 140 is how drill rig 100 applies the motive power to rotate the drill string 112 to drill at borehole cavity bottom 20.

Swivel 142 may be a mechanical device that suspends the weight of drill pipe 170, provides for the rotation of the drill pipe 170 beneath it while keeping the upper portion stationary, and permits the flow of drilling mud 154 from a standpipe 162 without leaking. Swivel 142 may hang directly under a traveling block 150 of hoisting system 130 directly above kelly drive 140. Swivel 142 may provide the ability for the kelly and subsequently drill string 112 to rotate while allowing hoisting system 130 to remain in a stationary rotational position. In addition, swivel 142 may allow vertical movement of drill string 112 up and down derrick 102 while simultaneously allowing the introduction of drilling fluid into drill string 112.

Hoisting system 130 may be a collection of parts that cooperate to raise or haul up with mechanical help. Hoisting system 130 may include a drawworks 144, a drilling cable 146, a crown block 148, a traveling block 150, and a lifting hook 152—a device to grab and lift loads through a hoist. Drill rig 100 may connect lifting hook 152 between traveling block 150 and swivel 142. Drill rig 100 may connect crown block 148 to derrick crown 118 and may secure drawworks 144 to substructure platform 122. In addition, drill rig 100 may pass drilling cable 146 from drawworks 144, around crown block 148, and around traveling block 150.

Drawworks 144 may be a machine on drill rig 100 having a large-diameter steel spool, brakes, a power source, and assorted auxiliary devices. As a large winch, drawworks 144 may spool off or take in drilling cable/line 146 to raise or lower drill string 112. Drilling cable 146 may be a large diameter, multi-thread, twisted wire rope that drill rig 100 runs run over, threads through, or reeves through crown block 148 and traveling block 150. This gives the arrangement a mechanical advantage in a "block and tackle" or "pulley" fashion. Drilling cable 146 may facilitate the lowering and lifting of drill string 112 into and out of wellbore 16. The art refers to the drill line from drawworks 144 to crown block 148 as the fast line 153. Gravity may reel out drilling cable 146 from drawworks 144 and engines 133 may take in drilling cable 146.

Crown block 148 and traveling block 150 each may be an assembly of sheaves. A sheave may be a wheel or roller with a groove along its edge for holding a belt, rope, or cable. When hung between two supports and equipped with a belt, rope, or cable, one or more sheaves make up a pulley. The sheaves may receive drilling cable 146. Crown block 148 may be mounted on derrick beams 114 at derrick crown 118 of derrick 102. Traveling block 150 may be secured within drilling cable 146 and move up or down in derrick 102.

Drilling mud circulation system 132 may be a group of independent but interrelated elements that cooperate to circulate drilling fluid 154 into and out of borehole 10. Drilling fluid 154 may be a fluid such as water based and non-aqueous mud or gaseous drilling fluid used to drill boreholes into the earth. Drilling fluid 154 may provide hydrostatic pressure within wellbore 10 to prevent formation fluids from entering into wellbore 10. In addition, drilling fluid 154 may keep drill bit 202 cool and clean during drilling, and may carry out drill cuttings 156 from wellbore 10. This description may use the term mud, drilling mud, and drilling fluid 154 interchangeable.

Drilling mud circulation system 132 may include a mud pump 158, a mud pit 160, a standpipe 162, a kelly hose 164, and a mud return line 166. Drill rig 100 may connect mud pump 158 to mud pit 160. Drill rig 100 may position standpipe 162 between mud pump 158 and kelly hose 164. In addition, drill rig may connect kelly hose to drill string 112 and may connect mud return line 166 between overgauge 22 of borehole cavity 18 and mud pit 160. In operation, mud pump 158 may draw mud 154 from mud pit 160 to pass mud 154 down through standpipe 162, kelly hose 164, drill string 112, and up through casing annulus 22 and mud return line 166 to return mud 154 and the retrieved cuttings 156 to mud pit 160.

Mud pump 158 may be a large, high-pressure reciprocating pump used to circulate drilling mud 154 on drill rig 100. Mud pit 160 may be a steel tank secured to ground 12 or an open pit dug in ground 12 to hold drilling mud 154 or waste materials such as well bore cuttings or drilling mud sediments. Standpipe 162 may be a rigid metal conduit fixed to metal beams 114 to provide a pathway for drilling mud 154 to travel about one-third of the way up derrick 102, where it connects to kelly hose 164. Kelly hose 164 may be a flexible, steel reinforced, high pressure hose that connected to swivel 142 to connect standpipe 162 to a goose-neck on swivel 142 above the kelly. Kelly hose 164 allows free vertical movement of the kelly while facilitating the flow of drilling fluid 154 through the system and down drill string 112. Mud return line 166 may be a pipe to connect mud pathways in blowout prevention equipment 110 to mud pit 160.

Blowout prevention equipment 110 may include a large valve connected to rotary head 136 that can seal off at the surface wellhead 19. Blowout prevention (BOP) equipment 110 may include preventers, spools, valves, and nipples connected to the top of wellhead 19 to prevent the uncontrolled escape of oil or gas. During drilling or well interventions, drill rig 100 remotely may close off the hydraulically actuated valve if overpressure from an underground zone causes formation fluids such as oil or natural gas to enter wellbore 10 and threaten drill rig 100. By closing this valve, the drilling crew can prevent explosive pressure release, thus regaining control of the downhole pressure.

Drill string 112 may be a hollow column/string of mechanical components to transmit rotational power and drilling fluid to a drill bit 202. Drill string 112 may include a transition pipe 168, a drill pipe 170 (or drill rod 170), and a bottom hole assembly 200 joined together in series using special threaded connections such as tool joints. Drill string 112 may be hollow to allow drill rig 100 to pump drilling fluid 154 down through drill string 112 and circulated back up annulus 18, since annulus 18 presents a void between drill string 112 and formation borehole 10.

Transition pipe 168 may be a heavyweight drill pipe (HWDP) to make a flexible transition between drill collars and an upwardly directed end of a drill pipe 170. This helps to reduce the number of fatigue failures seen directly above bottom hole assembly 200. A secondary use of transition pipe 168 is to add additional weight to drill bit 202.

Drill pipe 170 may be heavy seamless steel tubing utilized to rotate drill bit 202 and circulate drilling mud 154. Each section of drill pipe 170 may be about 30 feet long, where threaded tool joints may fasten them together. In addition, drill string 112 may use drill stem subs to connect drill string 112 elements. Drill string 112 typically may be about 15,000 feet (4.6 km) long for an oil or gas well vertically drilled onshore in the United States and may extend to over 30,000 feet (9.1 km) for an offshore deviated (non-vertical) well. Drill pipes 170 makes up the majority of drill string 112.

Figure 5:
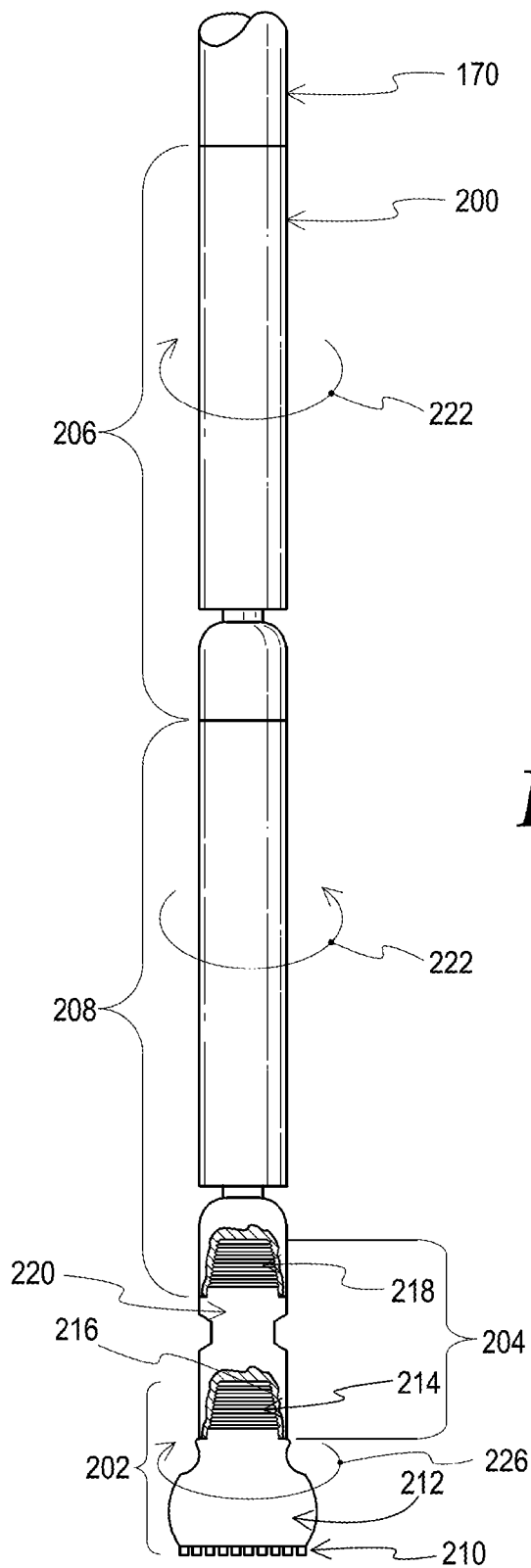
FIG. 5 is an elevated view of a multiplier sub, in accordance with features of the present invented system.

The below description provides details on a multiplier sub 300 (FIG. 5). The multiplier sub 300 may be utilized as part of a bottom hole assembly 200 in a drill rig to maintain a desired revolutions per minute (rpm) of a drill bit 202 while decreasing the speed of rotary equipment such as drill rods 170, a rotary head (not shown), and a rotary table (not shown).

For example, a drill rig may include an above ground tool drive prime mover and may operate both the drill bit 202 and the above-ground rotary equipment at 200 rpms. However, a drill rig utilizing a series of two multiplier subs in a drill string 12 may operate the aboveground rotary equipment at 50 rpm. The first multiplier sub may double the 50 rpm speed to 100 rpm. The second multiplier sub then may double the 100 rpm to 200 rpm so that the drill bit 202 turns at the desired 200 rpm. The relatively slower 50 rpm speed of drill rods 170, a rotary head, and a rotary table reduce the vibrations experienced in the drill rig. In addition to this below ground mechanical system reducing vibrations in the above ground drill rig 100, the multiplier sub 300 provides benefits similar to that of a downhole motor without the added cost of a separate high-pressure drilling mud system needed to operate a down-hole motor. Various elements of conventional rotating drilling systems referenced throughout this portion of the specification, including above-ground portions of such systems, are found in textbooks and widely disseminated literature related to oil and gas well drilling, including, but not limited to, R. Baker, "A Primer of Oilwell Drilling" (5$^{th}$ Edition, Petroleum Extension Service, Univ. of Tex., Austin, 1996), the entirety of which is incorporated herein by reference.

FIG. 5 is a detailed view of a bottom-hole assembly 200. The bottom-hole assembly (BHA) 200 may be the lowest 70-100 meters portion of the drill string. As a group of components that make up the lower end of the drill string, the bottom-hole assembly 200 may include the drill bit 202, a drill bit sub 204, a first multiplier sub 206, and a second multiplier sub 208. The bottom hole assembly 200 may connect the first multiplier sub 206 and the second multiplier sub 208 together and may connect the drill bit sub 204 between the drill bit 202 and the second multiplier sub 208.

The bottom-hole assembly 200 additionally may include drill collars, which are heavy, thick-walled tubulars, used to apply weight to the drill bit 202, and stabilizers to keep the drilling assembly centered in the borehole 11. The bottom-hole assembly 200 also may contain other components such as a rotary steerable system, a measurement while drilling (MWD) tool, and a logging while drilling (LWD) tool. The drill bit 202, drill bit sub 204, first multiplier sub 206, and second multiplier sub 208 are discrete components and the bottom hole assembly 200 may place other elements between them.

The drill bit 202 may be a boring and cutting element used in drilling wellbores to break-up the rock formations. The drill bit 202 may be hollow and include jets to allow for the expulsion of drilling fluid at high velocity and high pressure to help clean the drill bit 202 and help to break apart softer rock formations. The drill bit 202 may include cutting elements 210 connected to a circulating element 212. The drill bit 202 may connect the circulating element 212 to a drill bit pin connector 214. The drill bit 202 may advance inwardly into earth 9 from the point at which the drill bit 202 pierces earth 9 and acts on the entire peripheral extent of the borehole 11 as the drill bit 202 advances.

The cutting elements 210 may be a roller-cone device attached to the end of the drill string 12 having cutters to break apart, cut, or crush rock formations when drilling the wellbore 11. In one example, the cutting elements 210 may be part of a polycrystalline diamond compact (PDC) cutter as discussed, supra. The circulating element 212 may permit the passage of drilling fluid (such as mud) and may use hydraulic force of drilling mud to improve drilling rates. The drill bit pin connector 214 may be a male threaded part of a thread coupling having a cooperating female thread box to mate two discrete parts of the drill string 12. The drill bit pin connector 214 may be a rotary-shouldered tool joint having a conical shape.

"Sub-" is a prefix that may mean under or below. In wellbore drilling, subs are small sections of pipe run between and below drill collars and other drill string elements to do various functions. The bottom hole assembly 200 may use the drill bit sub 204 to make a connection between drill bit 202 and the second multiplier sub 208. The drill bit sub 204 may include a drill bit sub box connector 216 connected to a drill bit sub pin 218 via a drill bit sub body 220. The bottom hole assembly 200 may screw the drill bit pin connector 214 into the drill bit sub box connector 216 and secure the two together with a cotter pin, for example. Here, the drill bit pin connector 214 and the drill bit sub box connector 216 may form a pin-to-box joint where one end of this male-to-female coupling is threaded on the outside (pin) and the opposite end threaded on the inside (box).

Figure 7:
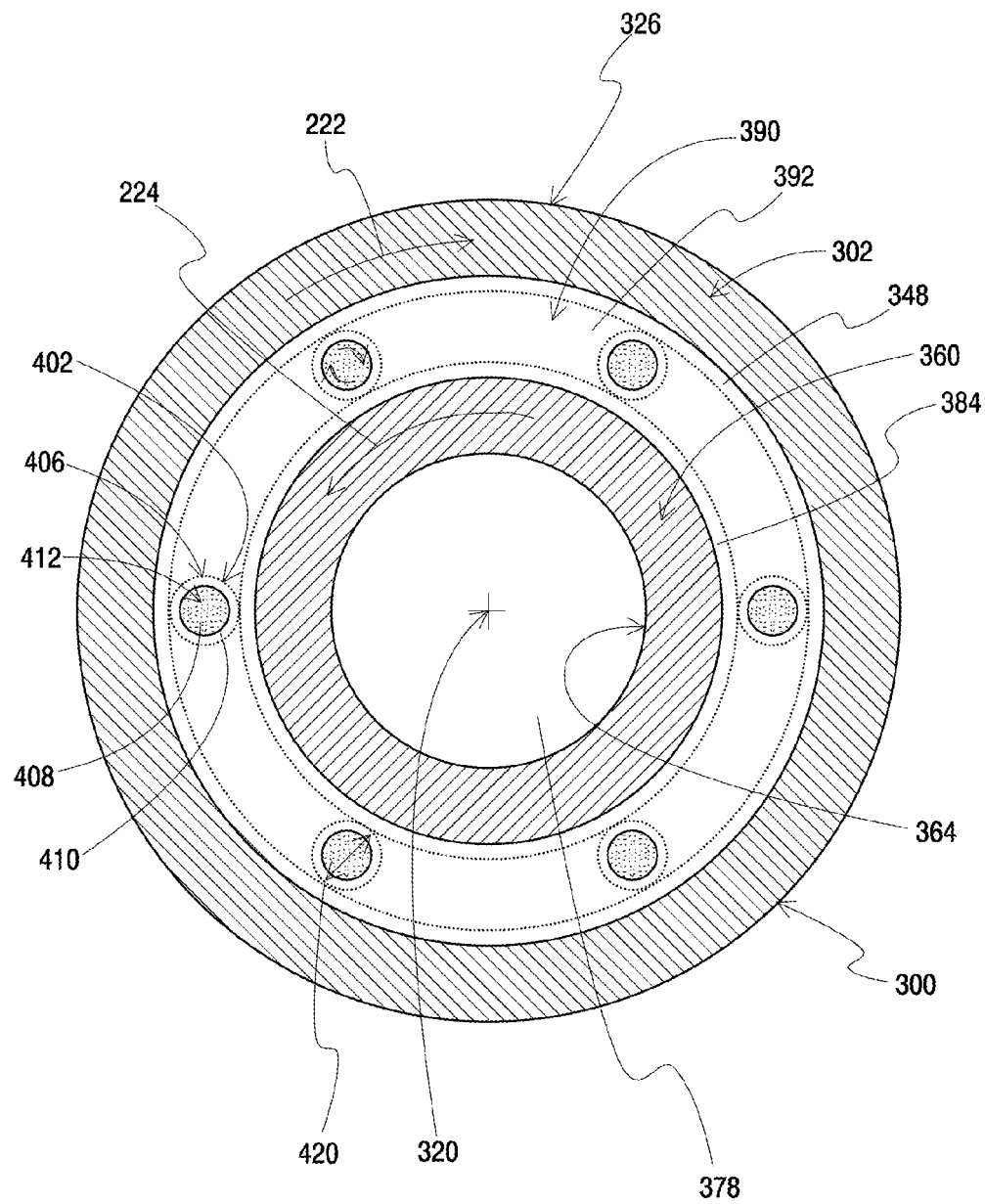
FIG. 7 is view of FIG. 6 taken along lines 7-7, showing rotation of the top sub in accordance with features of the present invention.

In operation, the drill pipe 170 and an outside portion of the first multiplier sub 206 may spin in a clockwise direction (i.e., a right hand rotation) shown by a first arrow 222. FIG. 7 provides an axial view of this rotation.

Figure 8:
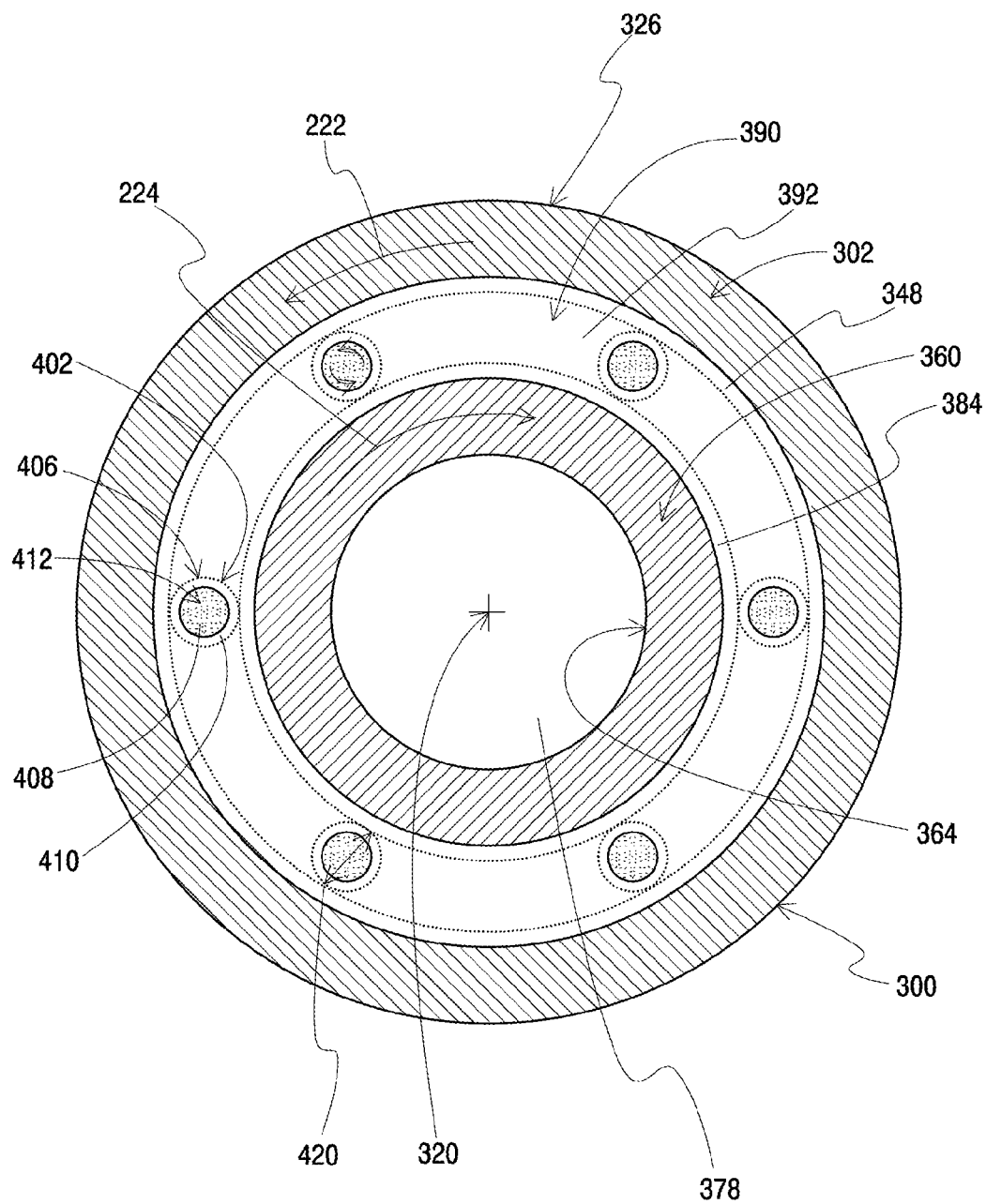
FIG. 8 is a view of FIG. 6 taken along lines 8-8, showing rotation of the inferior or second sub, in accordance with features of the present invention.

The right hand rotation of the superior or first sub causes both an inside portion of the first multiplier sub 206 and an outside portion of the second multiplier sub 208 to rotate in an opposite direction, namely in a counterclockwise (i.e., left hand rotation) direction shown by a second arrow 224. FIG. 8 provides an axial view of this left hand rotation.

The simultaneous left hand and right hand rotations of the first and second multiplier subs respectively causes an inside portion of the second multiplier sub 208, drill bit sub 204 and drill bit 202 to rotate in the originally intended direction, namely a clockwise direction (i.e. right hand direction) shown by a third arrow 226. Here, the rotational speed of bottom hole assembly 200 may increase by a factor of two for each change in direction. Thus, as the drill pipe 170 is rotated at 50 rpms, the first multiplier sub 206 will multiply that speed by a factor of two to increase it from 50 rpms to 100 rpms. The second multiplier sub 208 then may increase that 100 rpms by a factor of two, so that the drill bit 202 eventually turns at 200 rpms—or some other desired rotational speed.

Figure 6:
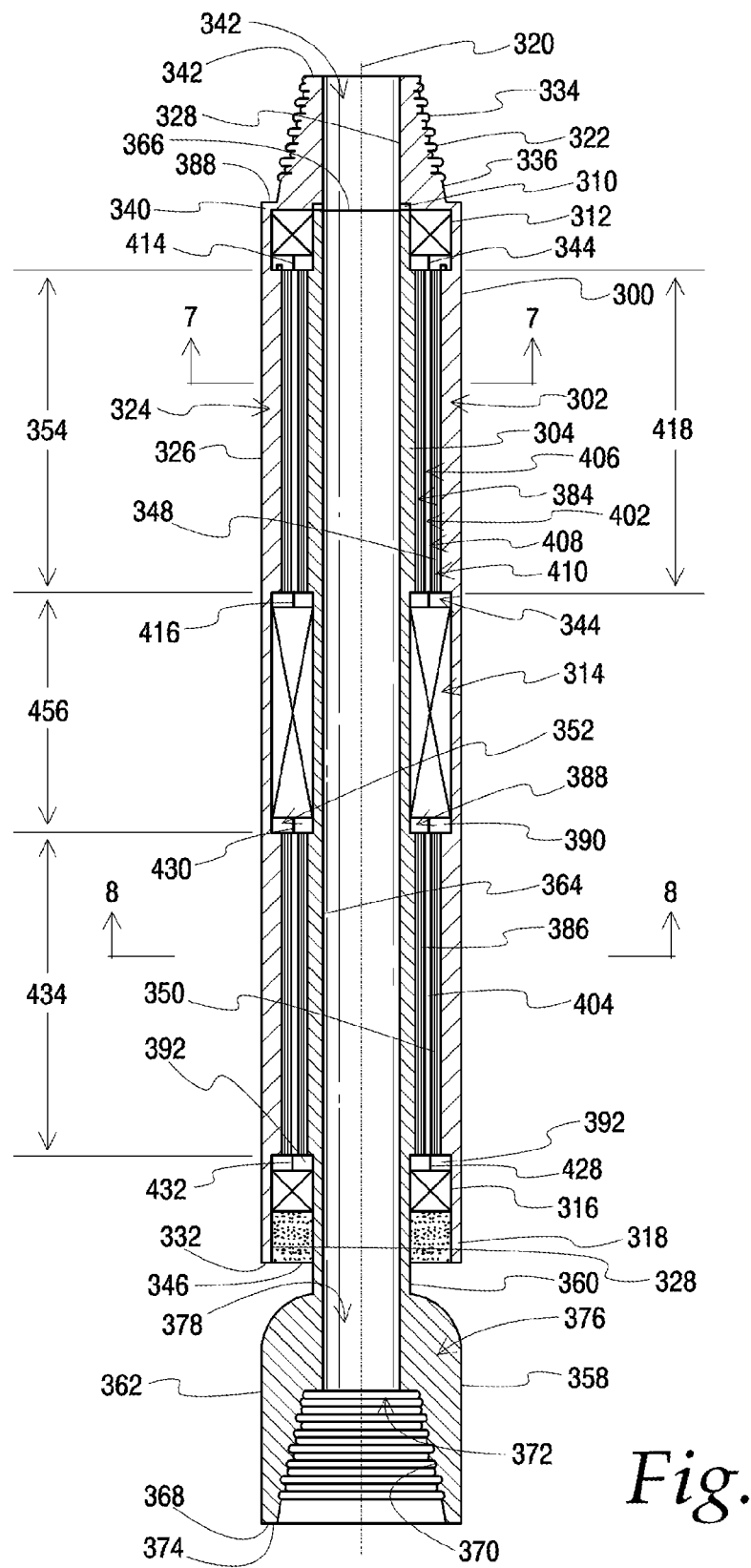
FIG. 6 is detailed view of two interacting multiplier subs, in accordance with features of the present invention.

FIG. 6 is a side, elevated view of the multiplier sub 300. A drill rig may utilize the multiplier sub 300 to form an elongated hole 11 by dislocating solid material of the earth 9. The multiplier sub 300 may be a device to multiply the revolutions per minute of drill pipe 170 above it. Rather than requiring a separate mud machine to push extremely high pressure mud into a downhole motor to turn the drill bit as in U.S. Pat. No. 4,613,002 (Pitman et al.), the drill rig 200 may mechanically drive the multiplier sub 300 with the torque of drill pipe 170 itself to increase the revolutions per minute of drill bit 202. Here, the multiplier sub 300 may be a drilling sub designed to mechanically increase the rotations per minute (RPM) of drill bit 202 without increasing the speed of drill rods 170, rotary head, or rotary table 138 above hole. The multiplier sub 300 will have benefits expected from a downhole motor without the added cost of high pressure drilling mud systems to operate the device. In one example, the multiplier sub 300 may have an overall length of approximately thirty inches.

The multiplier sub 300 may include a sleeve 302, a mandrel 304, a first gear cluster 402, a second gear cluster 404, a mandrel bearing 310, an upper bearing 312, an intermediate bearing 314, a lower bearing 316, and a lock 318. The multiplier sub 300 may arrange the mandrel bearing 310, the first gear cluster 402, the intermediate bearing 314, second gear cluster 404, lower bearing 316, and lock 318 top down within the sleeve 302 in series to form a stack centered on a main axis 320. The multiplier sub 300 may center the mandrel 304 on the main axis 320 within this stack to extend out of the sleeve 302. The drill string 12 may attach the second multiplier sub 206 or drill bit sub 204 to the multiplier sub 300. In operation, the drill string 12 may spin the sleeve 302 in a first direction at a first speed. The first gear cluster 402 and second gear cluster 404 may increase this speed so that the second gear cluster 404 changes directions and speeds up.

The sleeve 302 may be a tubular form open at two ends to receive items therein. It may include a pin connector 322 attached to a sleeve tube 324. The sleeve 302 may further include a sleeve outer surface 326 and a sleeve inner surface 328 sandwiched between a sleeve top 330 and a sleeve bottom 332.

The pin connector 322 may be a threaded male connector to engage female threads to form a rigid sealed pipe joint. The pin connector 322 may receive motion from uprotation components. The pin connector 322 may include pin threads 334 extending radially outward from sleeve top 330 to a pin base 336 and a make and break pin shoulder 338 positioned around pin base 336 and positioned above a pin tong area 340. That area within the sleeve inner surface 328 from the sleeve top 330 through pin tong area 340 may form a pin fluid conduit 342. The pin fluid conduit 342 may be a hollow cylindrical shape through which drilling mud may pass downward.

The sleeve tube 324 may be a long, hollow, cylindrical object to continue rotational motion from the pin connector 322 and impart that rotational motion to elements within sleeve tube 324. In one example, the sleeve tube 324 may have a thickness of ½ to ¾ inch, and may include a sleeve tube interior 344 as a hollow space surrounded by sleeve inner surface 328 and accessible through a sleeve tube interior opening 346. The sleeve tube 324 may include a first sleeve teeth set 348 and a second sleeve teeth set 350 secured within the sleeve tube interior 344 and separated by a sleeve bearing gap 352.

The first sleeve teeth set 348 and second sleeve teeth set 350 each may include a number of uniform linkages that project radially inward towards main axis 320 to mesh with and drive other gear teeth. Each tooth shape may be part of a segment of a straight edge or a curved shape such as a helix. A user may produce first the sleeve teeth set 348 by machining material from sleeve inner surface 328. The second sleeve teeth set 350 may be a removable teeth ring that a user may fix in place and remove to with a same or different sized set of the second sleeve teeth set 350. The first sleeve teeth set 348 may define a first sleeve teeth set length 354.

The sleeve bearing gap 352 may be an empty space between the first sleeve teeth set 348 and second sleeve teeth set 350 to receive the intermediate bearing 314. As discussed below, the sleeve bearing gap 352 also may act as a lubrication reserve. It may further define a sleeve bearing gap length 356 as measured between the first sleeve teeth set 348 and second sleeve teeth set 350.

The sleeve outer surface 326 may be a cylindrically shaped, radial outer boundary of the sleeve 302 facing away from the main axis 320. The sleeve inner surface 328 may be a discontinuous inner boundary of sleeve 302 facing towards the main axis 320. The sleeve top 330 may be an uppermost part of the sleeve 302 and the sleeve bottom 332 may be a lowermost part of the sleeve 302.

The mandrel 304 may be a tubular form to cooperate with the sleeve 302 in transferring motion from the sleeve 302 to the mandrel 304. In addition, the mandrel 304 may be open at two ends to allow downward passage of drilling fluid 154. It may include a box connector 358 attached to a mandrel tube 360. It may further include a mandrel outer surface 362 and a mandrel inner surface 364 sandwiched between a mandrel top 366 and a mandrel bottom 368.

The box connector 358 may be a threaded female connector to engage male threads to form a rigid sealed pipe joint. The box connector 358 may include box threads 370 extending radially inward as part of a counterbore from the mandrel bottom 368 to a box base 372. The box connector 358 may include a make and break box shoulder 374 positioned as part of the mandrel bottom 368 and positioned below a box tong area 376.

The mandrel tube 360 may be a long, hollow, cylindrical object so as to receive motion from the sleeve 302 through the first gear cluster 402 and second gear cluster 404 and impart that rotational motion to box connector 358. That area within mandrel inner surface 364 from the mandrel top 366 through the box tong area 376 may form a box fluid conduit 378. This conduit 378 may be a hollow cylindrical shape to receive drilling mud from pin fluid conduit 342 to pass the mud downward. In one example, the box fluid conduit 378 may have a diameter of approximately 1½ inches.

The mandrel tube 360 may include a mandrel tube exterior surface 380 as an exterior surface surrounding the mandrel inner surface 364. The mandrel tube 360 may include a first mandrel teeth set 384 and a second mandrel teeth set 386 secured within the mandrel tube exterior 380 and separated by a mandrel bearing gap 388. The first mandrel teeth set 384 and second mandrel teeth set 386 each may include a number of uniform linkages that project radially outward away from the main axis 320 and towards the first sleeve teeth set 348 and second sleeve teeth set 350 to mesh with and drive other gear teeth. Each tooth shape may be part of a segment of a straight edge or a curved shape such as a helix. A user may produce the first mandrel teeth set 384 by machining material from the mandrel tube exterior surface 380. The second mandrel teeth set 386 may be a removable teeth ring that a user may fix in place and remove to with a same or different sized set of second mandrel teeth set 386.

The mandrel bearing gap 388 may be an empty space between the first mandrel teeth set 384 and second mandrel teeth set 386 to receive the intermediate bearing 314. As discussed below, the mandrel bearing gap 388 also may cooperate with the sleeve bearing gap 352 to act as a lubrication reserve. The mandrel outer surface 362 may be a discontinuous inner boundary of the mandrel 304 facing away from the main axis 320. The mandrel inner surface 364 may be a cylindrically shaped, radial inner boundary of the mandrel 304 facing towards the main axis 320. The mandrel top 366 may be an uppermost part of the mandrel 304 and the mandrel bottom 368 may be a lowermost part of the mandrel 304.

The first gear cluster 402 may be a grouping of pin gears 406 positioned between the first sleeve teeth set 348 and the first mandrel teeth set 384 to reside radially around main axis 320. Each pin gear 406 may be an elongated pin gear cylinder 408 having pin gear teeth 410 that project radially outward from a pin gear axis 412. Each tooth shape may be part of a segment of a straight edge aligned parallel to the axis of rotation 412 or a curved shape such as a helix. The pin gear 406 may include a first upper stem 414 and a first lower stem 416 centered on pin gear axis 412 and extending from pin gear cylinder 408 in opposite directions. The pin gear 406 may have a pin gear length 418 as measured from one end of the pin gear cylinder 408 to the other. The upper bearing 312 and intermediate bearing 314 may hold the first gear cluster 402 in position while allowing each pin gear 406 to rotate around its axis 412.

FIG. 7 is a section view of multiplier sub 300 taken along line 6-6 of FIG. 6. As noted above, first gear cluster 402 may be a grouping of pin gears 406 positioned between the first sleeve teeth set 348 and the first mandrel teeth set 384 to reside radially around main axis 320. In this example, first gear cluster 402 may include six pin gears 406 equally spaced around the main axis 320. A limit diameter may be a diameter on a gear at which a line of action intersects a maximum addendum circle of the mating gear for an external gear and intersects a minimum addendum circle of the mating gear for an internal gear. Each pin gear 406 may include a first pin gear limit diameter 420. In one example, the first pin gear limit diameter 420 may range from ⅝ to ¾ inches.

The second gear cluster 404 of FIG. 6 may be a grouping of pin gears 422 positioned between the second sleeve teeth set 350 and second mandrel teeth set 386 to reside radially around the main axis 320. Each pin gear 422 may be an elongated pin gear cylinder 424 having pin gear teeth 426 that project radially outward from a pin gear axis 428. Each tooth shape may be part of a segment of a straight edge aligned parallel to the axis of rotation 428 or a curved shape such as a helix. The Pin gear 422 may include a second upper stem 430 and a second lower stem 432 centered on the pin gear axis 428 and extending from the pin gear cylinder 424 in opposite directions. The pin gear 422 may have a pin gear length 434 as measured from one end of pin gear cylinder 424 to the other. The intermediate bearing 314 and lower bearing 316 may hold second gear cluster 404 in position while allowing each pin gear 422 to rotate around its axis 428.

Each pin gear 422 may include a second pin gear limit diameter 438. In one example, the second pin gear limit diameter 438 may be different from the first pin gear limit diameter 420. In practice, the first gear cluster 402 will receive the load before the second gear cluster 404 potentially to cause uneven wear between the two gear clusters. By making the second pin gear limit diameter 438 different from first pin gear limit diameter 420, multiplier sub 300 may work to adjust the transmitted load to be balanced between the first gear cluster 402 and second gear cluster 404 so that each gear system may experience substantially similar wear. In one example, the second pin gear limit diameter 438 may be more than the first pin gear limit diameter 420. In another example, second pin gear limit diameter 438 may be ninety percent of the first pin gear limit diameter 420.

The mandrel bearing 310 may be a support placed between pin tong area 340 and mandrel top 366 to allow them to move easily. In addition to permitting rotation between the parts, the mandrel bearing 310 may take thrusts from mandrel 304 parallel to the main axis 320 of revolution to support a high axial load while permitting rotation between the pin connector 322 and mandrel tube 360. The mandrel bearing 310 also may act as a seal to prevent leakage of lubrication fluid and drilling fluid 154. The multiplier sub 300 may position mandrel bearing 310 within sleeve tube interior 344 and secure mandrel bearing 310 within a seat formed in pin tong area 340.

The upper bearing 312 may be a device to allow constrained relative motion between the sleeve tube 324 and mandrel tube 360 so that each may rotate with very little rolling resistance and with little sliding. In addition to allowing rotation movement of the sleeve tube 324 and mandrel tube 360, the upper bearing 312 may function as an upper support for the first gear cluster 402 and allow each pin gear 406 to rotate about its pin gear axis 412 while taking thrusts from the first gear cluster 402 parallel to the main axis 320 of revolution. The upper bearing 312 also may act as a seal to prevent leakage of lubrication fluid and drilling fluid 154. The multiplier sub 300 may position upper bearing 312 within the sleeve tube interior 344 and secure the upper bearing 312 against the pin tong area 340 between the sleeve tube 324 and mandrel tube 360. The multiplier sub 300 may rotatably fix each first upper stem 414 within upper bearing 312.

The intermediate bearing 314 allows constrained relative motion between sleeve tube 324 and mandrel tube 360 so that each may rotate with very little rolling resistance and with little sliding.

In addition to allowing rotation movement of the sleeve tube 324 and mandrel tube 360, the intermediate bearing 314 may function as an intermediate support for the first gear cluster 402 and second gear cluster 404. The intermediate bearing 314 may allow each pin gear 406 and each pin gear 422 to rotate about its pin gear axis while taking thrusts from the first gear cluster 402 and second gear cluster 404 parallel to the main axis 320 of revolution. The intermediate bearing 314 also may act to allow lubrication fluid to flow through intermediate bearing 314. The multiplier sub 300 may position intermediate bearing 314 within the sleeve tube interior 344 and secure the intermediate bearing 314 between the sleeve tube 324 and mandrel tube 360. The multiplier sub 300 may rotatably fix each first lower stem 416 and each second upper stem 430 within intermediate bearing 314.

The lower bearing 316 allows constrained relative motion between the sleeve tube 324 and mandrel tube 360 so that each may rotate with very little rolling resistance and with little sliding. In addition to allowing rotation movement of sleeve tube 324 and mandrel tube 360, the lower bearing 316 may function as a lower support for the second gear cluster 404 and allow each pin gear 422 to rotate about its pin gear axis 428 while taking thrusts from the second gear cluster 404 parallel to the main axis 320 of revolution. The lower bearing 316 also may act as a seal to prevent leakage of lubrication fluid and drilling fluid carrying fragmented cuttings. The multiplier sub 300 may position the lower bearing 316 within sleeve tube interior 344 at a position above and against the lock 318 and secure the lower bearing 316 between the sleeve tube 324 and mandrel tube 360. The multiplier sub 300 may rotatably fix each second lower stem 432 within lower bearing 316.

The lock 318 may be a threaded ring that may hold elements within the sleeve tube interior 344. The lock 318 may screw into the sleeve tube interior 344 at a position near the sleeve bottom 332. The main axis 320 may be a straight line through multiplier sub 300 to act as a center around which the multiplier sub 300 may rotate.

When assembled, multiplier sub 300 defines a lubrication channel 390. The lubrication channel 390 may be an empty space between the sleeve tube 324 and mandrel tube 360 and between the components residing between sleeve tube 324 and mandrel tube 360. The multiplier sub 300 may pack the lubrication channel 390 with lubricant such as oil, grease, or other friction-lessening substance to reduce friction and minimize heating. In addition to lubricating the mandrel bearing 310, upper bearing 312, intermediate bearing 314, and lower bearing 316, the lubricant 392 may lubricate first gear cluster 402 and second gear cluster 404.

A teeth ratio between sleeve 302, mandrel 304, and first gear cluster 402 and between sleeve 302, mandrel 304, and second gear cluster 404 may be such that the rotational speed of sleeve 302 may be stepped upwards by a multiple so that a rotational speed of mandrel 304 may be greater than a rotational speed of the sleeve 302. In one example, the teeth ratio may step up the rotational speed of sleeve 302 by a multiple of two so that the mandrel 304 spins twice as fast as the sleeve 302. Generally, the invented multiplier sub can impart rotation speeds to the bit 14, or 212 that are between approximately 2 to 6 times faster than the rotation of the drill string 12 or sleeve 302.

It is to be understood that the above description is intended to be illustrative, and not restrictive. For example, the above-described embodiments (and/or aspects thereof) may be used in combination with each other. In addition many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The embodiment of the invention in which an exclusive property or privilege is claimed is defined as follows:

1. A method for repairing aberrations along a drill bore wall, the method comprising:
   a. using a rotary mud drill system to produce a drill hole, wherein the system employs a first return mud pressure value;
   b. stopping the rotary mud drill system when return mud pressure decreases to a second return mud pressure value at a point in the drill hole;
   c. positioning a reverse auger into the drill hole at said point;
   d. rotating the auger in a direction opposite the flights of the auger;
   e. introducing loose substrate into the annulus of the drill hole so as to cause said loose substrate to contact the auger;
   f. forcing the loose substrate into said aberrations by means of said auger rotation;

g. lifting and lowering the auger along longitudinally extending regions of the drill hole defining the point for a time and in substrate amounts sufficient to minimize the aberrations; and h. restarting the rotary mud drill system to extend the length of the drill bore to a depth deeper than said point.

2. The method as recited in claim 1 wherein the auger is a right hand screw configuration, and the auger is actuated by turning it on its longitudinal axis in a left hand direction.

3. The method as recited in claim 1 wherein the auger is a left hand screw configuration, and the auger is actuated by turning it on its longitudinal axis in a right hand direction.

4. The method as recited in claim 1 wherein the loose substrate is ⅜ inch sized bentonite.

5. The method as recited in claim 1 wherein the application of the substrate follows the introduction of bridging material.

6. The method as recited in claim 1 wherein the step of using a rotary mud drill system to produce a hole further comprises the step of:

a. locating aberrations within a formation by:
  i. determining average mud return pressures during drilling;
  ii. noting when the pressures initially drop; and
  iii. determining the depth of a mud rotary drill bit at the point of pressure drop.

\* \* \* \* \*

UNITED STATES PATENT AND TRADEMARK OFFICE
CERTIFICATE OF CORRECTION

PATENT NO.         : 8,672,058 B2                    Page 1 of 1
APPLICATION NO.    : 12/645741
DATED              : March 18, 2014
INVENTOR(S)        : Tommie E. Shelton, Jr.

It is certified that error appears in the above-identified patent and that said Letters Patent is hereby corrected as shown below:

On the Title Page, Item (12), delete "Tommie, Jr." and replace with "Shelton, Jr."

On the Title Page, Item (75) Inventors, delete the name "Shelton E. Tommie, Jr." and replace it with "Tommie E. Shelton, Jr."

Signed and Sealed this
Ninth Day of December, 2014

Michelle K. Lee
*Deputy Director of the United States Patent and Trademark Office*